(12) United States Patent
Mochimaru et al.

(10) Patent No.: US 7,061,637 B2
(45) Date of Patent: Jun. 13, 2006

(54) METHOD AND APPARATUS FOR IMAGE FORMING CAPABLE OF EFFECTIVELY COLLATING A STACK OF SINGLE-/DOUBLE-SIDED RECORDING SHEETS IN A DESIRED EJECTION TRAY

(75) Inventors: Hideaki Mochimaru, Kanagawa-ken (JP); Yasukuni Omata, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 906 days.

(21) Appl. No.: 09/915,398

(22) Filed: Jul. 27, 2001

(65) Prior Publication Data
US 2002/0060804 A1     May 23, 2002

(30) Foreign Application Priority Data

| Jul. 31, 2000 | (JP) | ............................. 2000-231575 |
| Jul. 31, 2000 | (JP) | ............................. 2000-231576 |
| Jun. 19, 2001 | (JP) | ............................. 2001-185475 |

(51) Int. Cl.
*G06F 15/00* (2006.01)

(52) U.S. Cl. ...................... 358/1.15; 358/1.18; 399/67; 399/179; 399/309; 399/400; 399/405; 347/104

(58) Field of Classification Search .............. 358/1.15; 399/403, 405, 309; 347/104
See application file for complete search history.

(56) References Cited

U.S. PATENT DOCUMENTS

| 3,724,944 A | 4/1973 | Sugita et al. .................. 355/18 |
| 3,765,760 A | 10/1973 | Mochimaru .................. 355/58 |
| 3,884,576 A | 5/1975 | Mochimaru et al. .......... 355/69 |
| 3,901,586 A | 8/1975 | Suzuki et al. ................ 359/726 |
| 4,056,320 A | 11/1977 | Mochimaru et al. .......... 355/75 |
| 4,105,326 A | 8/1978 | Mochimaru ................... 355/55 |
| 4,535,982 A | 8/1985 | Mochimaru .................. 271/127 |
| 4,605,299 A | 8/1986 | Mochimaru .................. 399/111 |
| 4,703,334 A | 10/1987 | Mochimaru et al. ......... 347/130 |

(Continued)

FOREIGN PATENT DOCUMENTS

JP     1-209470     8/1989

(Continued)

OTHER PUBLICATIONS

U.S. Appl. No. 09/877,184, filed Jun. 11, 2001, pending.

(Continued)

*Primary Examiner*—Joseph R. Pokrzywa
*Assistant Examiner*—Mark R. Milia
(74) *Attorney, Agent, or Firm*—Oblon, Spivak, McClelland, Maier & Neustadt, P.C.

(57) ABSTRACT

An image forming apparatus includes first and second image carrying members, ejection trays, and a sheet transferring mechanism. The first image carrying member carries images in increasing order of corresponding sheet numbers. The second image carrying member carries an image transferred from the first image carrying member. The ejection trays include a first ejection tray, which stacks output sheets in a straight or forward orientation, and a second ejection tray, which stacks output sheets in a reversed orientation. The sheet transferring mechanism transfers a recording sheet to the first and second image carrying members. The first and second image carrying members transfer images onto both first and second surfaces of the recording sheet, at the same time, in response to a selection between the first and second ejection trays in a double-sided recording mode so that the first and second ejection trays stack the recording sheets in increasing order of page numbers.

100 Claims, 11 Drawing Sheets

U.S. PATENT DOCUMENTS

| | | | | |
|---|---|---|---|---|
| 4,750,016 | A | * | 6/1988 | Kusumoto et al. .......... 399/405 |
| 4,753,543 | A | | 6/1988 | Mochimaru et al. ........ 400/703 |
| 4,757,344 | A | | 7/1988 | Idenawa et al. ............ 399/113 |
| 4,875,063 | A | | 10/1989 | Idenawa et al. ............ 347/152 |
| 4,945,390 | A | * | 7/1990 | Hasegawa et al. .......... 399/405 |
| 4,987,446 | A | | 1/1991 | Mochimaru et al. ........ 399/113 |
| 5,055,880 | A | * | 10/1991 | Fujiwara .................... 399/203 |
| 5,089,855 | A | | 2/1992 | Mochimaru et al. ........ 399/297 |
| 5,126,786 | A | * | 6/1992 | Tanaka ........................ 355/46 |
| 5,257,064 | A | * | 10/1993 | Okamoto .................... 355/24 |
| 5,394,231 | A | | 2/1995 | Sudo et al. ................. 399/228 |
| 5,418,607 | A | * | 5/1995 | Tani .......................... 399/364 |
| 5,499,078 | A | | 3/1996 | Kurokawa et al. .......... 399/31 |
| 5,559,590 | A | | 9/1996 | Arai et al. .................. 399/314 |
| 5,570,162 | A | | 10/1996 | Sohmiya .................... 399/174 |
| 5,594,540 | A | | 1/1997 | Higaya et al. .............. 399/326 |
| 5,615,872 | A | | 4/1997 | Mochimaru ................ 271/3.14 |
| 5,619,311 | A | | 4/1997 | Kurokawa et al. .......... 399/176 |
| 5,678,152 | A | | 10/1997 | Kohno et al. ............... 399/324 |
| 5,760,919 | A | * | 6/1998 | Acquaviva et al. .......... 358/450 |
| 5,781,825 | A | * | 7/1998 | Okamoto .................... 399/17 |
| 5,832,354 | A | | 11/1998 | Kouno et al. ............... 399/330 |
| 5,839,044 | A | * | 11/1998 | Taruki ........................ 399/361 |
| 5,848,323 | A | * | 12/1998 | Umeda et al. ................ 399/66 |
| 5,862,435 | A | * | 1/1999 | Suzumi et al. ................ 399/68 |
| 5,875,372 | A | * | 2/1999 | Sato et al. .................... 399/67 |
| 5,899,611 | A | * | 5/1999 | Haneda et al. .............. 399/309 |
| 5,915,147 | A | | 6/1999 | Kouno et al. ................ 399/69 |
| 5,966,556 | A | * | 10/1999 | Nakagawa et al. ........... 399/18 |
| 5,970,277 | A | * | 10/1999 | Shigeta et al. ................ 399/45 |
| 5,991,563 | A | * | 11/1999 | Haneda et al. ................ 399/68 |
| 6,151,057 | A | | 11/2000 | Yamazaki et al. .......... 347/248 |
| 6,173,136 | B1 | * | 1/2001 | Fuchiwaki et al. ........... 399/67 |
| 6,173,148 | B1 | | 1/2001 | Matsuda et al. ............. 399/310 |
| 6,205,301 | B1 | * | 3/2001 | Shigeta et al. ................ 399/66 |
| 6,304,742 | B1 | * | 10/2001 | Nunes et al. ................ 399/361 |
| 6,347,214 | B1 | | 2/2002 | Kaneko ...................... 399/397 |
| 6,350,072 | B1 | * | 2/2002 | Nunes et al. ................ 400/188 |
| 6,397,023 | B1 | * | 5/2002 | Underwood et al. .......... 399/82 |
| 6,559,967 | B1 | * | 5/2003 | Akiba et al. ................ 358/1.16 |
| 6,599,226 | B1 | * | 7/2003 | Asai et al. .................. 493/321 |

| | | |
|---|---|---|
| 2002/0060804 | A1 | 5/2002 Mochimaru et al. |

FOREIGN PATENT DOCUMENTS

| | | |
|---|---|---|
| JP | 3-253881 | 11/1991 |
| JP | 6-11919 | 1/1994 |
| JP | 9-12210 | 1/1997 |
| JP | 9-34183 | 2/1997 |
| JP | 9-328234 | 12/1997 |
| JP | 10-142869 | 5/1998 |
| JP | 10-166672 | 6/1998 |
| JP | 11-258864 | 9/1999 |
| JP | 2000-19799 | 1/2000 |
| JP | 2000-38234 | 2/2000 |

OTHER PUBLICATIONS

U.S. Appl. No. 09/915,398, filed Jul. 27, 2001, pending.
U.S. Appl. No. 09/962,681, filed Sep. 26, 2001, pending.
U.S. Appl. No. 09/960,295, filed Sep. 24, 2001, pending.
U.S. Appl. No. 10/161,742, filed Jun. 5, 2002, pending.
U.S. Appl. No. 09/915,398, filed Jul. 27, 2001, Mochimaru et al.
U.S. Appl. No. 10/680,091, filed Oct. 8, 2003, Omata et al.
U.S. Appl. No. 10/861,407, filed Jun. 7, 2004, Omata et al.
U.S. Appl. No. 10/875,383, filed Jun. 24, 2004, Omata.
U.S. Appl. No. 10/252,104, filed Sep. 23, 2002, pending.
U.S. Appl. No. 10/086,412, Mar. 4, 2002, pending.
U.S. Appl. No. 10/176,672, filed Jun. 24, 2002, pending.
U.S. Appl. No. 10/321,455, filed Dec. 18, 2002, Omata et al.
U.S. Appl. No. 10/310,892, filed Dec. 6, 2002, pending.
U.S. Appl. No. 10/434,079, filed. May 9, 2003, Omata et al.
U.S. Appl. No. 10/424,077, filed Apr. 28, 2003, Suzuki et al.
U.S. Appl. No. 10/645,614, Aug. 22, 2003, Sohmiya et al.
U.S. Appl. No. 10/012,327, filed Dec. 12, 2001, pending.
U.S. Appl. NO. 09/983,964, filed Oct. 26, 2001, pending.
U.S. Appl. No. 11/226,314, filed Sep. 15, 2005, Mochimaru et al.

* cited by examiner

FIG. 9

| RECORDING MANNER \ READING MANNER | | a<br>I) R1<br>II) S-S<br>III) 1,2,3,4 | b<br>I) R1<br>II) D-S<br>III) 2,1,(4),3 | c<br>I) R2<br>II) S-S<br>III) 1,2,3,4 | d<br>I) R2<br>II) D-S<br>III) 1,2,3,(4) |
|---|---|---|---|---|---|
| A | IV) 40<br>V) S-S | VI) 1,2,3,4<br>VII) 2 | VI) 1,2,3<br>VII) 2 | VI) 1,2,3,4<br>VII) 2 | VI) 1,2,3<br>VII) 2 |
| B | IV) 40<br>V) D-S | VI) 2,1,4,3<br>VII) 1,2,3 | VI) 2,1,3<br>VII) 1,2,3&2 | VI) 2,1,4,3<br>VII) 1,2,3 | VI) 2,1,3<br>VII) 1,2,3&2 |
| C | IV) 44<br>V) S-S | VI) 1,2,3,4<br>VII) 1,3 | VI) 1,2,3<br>VII) 1,3 | VI) 1,2,3,4<br>VII) 1,3 | VI) 1,2,3<br>VII) 1,3 |
| D | IV) 44<br>V) D-S | VI) 1,2,3,4<br>VII) 1,2,3 | VI) 1,2,3<br>VII) 1,2,3&1,3 | VI) 1,2,3,4<br>VII) 1,2,3 | VI) 1,2,3<br>VII) 1,2,3&1,3 |

METHOD AND APPARATUS FOR IMAGE FORMING CAPABLE OF EFFECTIVELY COLLATING A STACK OF SINGLE-/DOUBLE-SIDED RECORDING SHEETS IN A DESIRED EJECTION TRAY

CROSS-REFERENCE TO RELATED APPLICATIONS

This application claims priority to Japanese Patent Application Nos. 2000-231576, filed on Jul. 31, 2000, 2000-231575, filed on Jul. 31, 2000, and 2001-185475, filed on Jun. 19, 2001, wherein the entire contents of these three Japanese Patent Applications are hereby incorporated by reference herein.

BACKGROUND OF THE INVENTION

1. Field of the Invention

The present invention generally relates to a method and apparatus for image forming and more particularly, to a method and apparatus for image forming, which is capable of effectively collating a stack of single-sided or double-sided recording sheets in increasing order of page numbers in a desired ejection tray.

2. Discussion of Background

Some conventional image forming apparatuses, such as copying machines, printers, facsimiles, and other similar devices, are capable of performing a double-sided recording operation for recording on both the first and second sides of a recording sheet. Typically, in the double-sided recording operation of these conventional machines, a first toner image is formed on the first side of a recording sheet and a second toner image is formed on the second side of the same recording sheet after the first toner image is fixed. Before the second toner image is formed, the recording sheet is reversed. After completion of the second image forming operation, the second toner image is fixed and, as a result, a double-sided recording is achieved.

Various problems may occur with the above-described double-sided recording operation, such as difficulty in reversing the recording sheet, unstable sheet transfer due to a paper curl problem caused by the first fixing process, and other similar problems.

On the other hand, each of Japanese Unexamined Patent Application Publication Nos. 1-209470 (hereinafter "JP'470") and 10-142869 (hereinafter "JP 869") describes an image forming apparatus which transfers toner images to both the first and second sides of a recording sheet with two image carrying members and fixes the toner images via an one time fixing process.

In the image forming apparatus of JP '470, a first toner image is formed on a photoconductive member and is transferred onto a transfer belt with a first transfer member. Then, a second toner image is formed on the photoconductive member and is transferred onto a first surface of a recording sheet with the first transfer member. After that, the first toner image on the transfer belt is transferred onto the second side of the recording sheet with a second transfer member. Thereby, the first and second toner images are transferred onto both the first and second sides of the recording sheet and the recording sheet is then subjected to a fixing process.

Japanese Unexamined Patent Application Publication No. 3-253881 (hereinafter "JP'881") describes an image forming apparatus which is similar to the image forming apparatus of JP '470. A difference between the two image forming apparatuses is that the image forming apparatus of JP '881 eliminates the second transfer member by reversing a polarity of the second toner image on the photoconductive member before it is transferred to the recording sheet. Thereby, the first and second toner images are transferred onto both the first and second sides, respectively, of the recording sheet without the second transfer member.

The image forming apparatus of JP '869 is provided with two transfer members and performs an one time fixing operation for fixing color images which have been transferred onto both the first and second sides of a recording sheet with the first and second transfer members, respectively. This image forming apparatus uses a guide member, which includes a flat plate on which a plurality of star-like wheels are rotatably mounted, to smoothly transfer the double-sided recording sheet with the color images on both the first and second sides thereof.

However, the image forming apparatuses, of JP '470, JP '869, and JP '881, have a drawback with respect to the stack order of the output recording sheets. For example, as shown in FIG. 1, a stack of recording sheets are output face down in a tray T1, but are face up in a tray T2. Therefore, the stack of recording sheets output to the trays T1 and T2 are different in page number order.

Japanese Unexamined Patent Application Publication No. 2000-19799 (hereinafter "JP'799") describes an image forming apparatus that includes a tray switching mechanism for switching between face-down and face-up ejection trays. A sheet reverse mechanism is used to make it possible to switch the ejection trays without changing relationships between images and surfaces of a recording sheet. A technique is also used in which the relationships between images and surfaces of a recording sheet are changed when the ejection trays are switched from one to the other in an image forming apparatus having no sheet reverse mechanism.

However, JP '799 has a drawback in that a thick sheet is not properly transferred. This is because a recording sheet is bent when it is reversed by the sheet reverse mechanism.

In a case where an image forming apparatus, having a plurality of ejection trays as shown in FIG. 1, applies the technique for changing the relationships between images and surfaces of a recording sheet as described in JP '799, it is not easy for a user to properly instruct the change of the relationships between images and surfaces of a recording sheet.

Japanese Unexamined Patent Application Publication No. 2000-38234 (hereinafter "JP'234") describes an image forming apparatus which reads images on both the first and second sides of a double-sided original and records the read images on both the first and second sides, respectively, of a recording sheet. In this apparatus, the double-sided original is reversed after a completion of reading the first side of the original and then, the second side of the original is read. In the recording operation, the recording sheet is reversed after the recording of a first image on a first side of the recording sheet is completed and then, a second image is recorded on the second side of the recording sheet.

Japanese Unexamined Patent Application Publication No. 11-258864 describes an image forming apparatus which reads images on both the first and second sides of a double-sided original by moving the original and then recording the read images on both the first and second sides of a recording sheet via a one time sheet transferring process.

However, the apparatuses which are capable of double-sided reading and double-sided recording have the drawback that they do not collate a stack of recording sheets, particularly when a plurality of ejection trays are used, and this drawback is in addition to the problems they have in common with conventional apparatuses (i.e., low sheet transfer stability and larger machine size).

SUMMARY OF THE INVENTION

The present invention provides a novel image forming apparatus which avoids the drawbacks of the prior art. A first example of an image forming apparatus includes first and second image carrying members, a plurality of ejection trays, and a sheet transferring mechanism. The first image carrying member carries images in increasing order of corresponding sheet numbers. The second image carrying member carries an image transferred from the first image carrying member. The plurality of ejection trays includes a first ejection tray configured to stack a plurality of output sheets in a forward orientation and a second ejection tray configured to stack a plurality of output sheets in a reversed orientation. The sheet transferring mechanism transfers a recording sheet to a nip formed between the first and second image carrying members. In the image forming apparatus of the first example, the first image carrying member transfers an image to a first surface of the recording sheet and, at the same time, the second image carrying member transfers a second image to a second surface of the recording sheet in response to a selection between the first and second ejection trays in a double-sided recording mode so that the first and second ejection trays stack the plurality of recording sheets in increasing page number order.

The image forming apparatus of the first example may further include a mode selecting mechanism configured to select any one of a single-sided recording mode and a double-sided recording mode.

The image forming apparatus of the first example may further include a tray selecting mechanism configured to select any one of the first and second ejection trays.

The image forming apparatus of the first example may further include a sheet selecting mechanism configured to select the type of sheet to be used. In this case, any one of the first and second ejection trays is selected in accordance with a selection made by the sheet selecting mechanism.

The image forming apparatus of the first example may further include a plurality of sheet supplying mechanisms each configured to supply the recording sheets to the sheet transferring mechanism.

The image forming apparatus of the first example may further include a cassette selecting mechanism configured to select one of the plurality of sheet supplying mechanisms.

The image forming apparatus of the first example may further include a sheet selecting mechanism configured to select the type of sheet to be used. In this case, one of the plurality of sheet supplying mechanisms is selected in accordance with a selection made by the sheet selecting mechanism.

The image forming apparatus of the first example may further include an extra sheet supplying mechanism configured to insert a recording sheet in an approximately forward orientation. In this case, a recording sheet is transferred from the extra sheet supplying mechanism to the first ejection tray via the sheet transferring mechanism.

The image forming apparatus of the first example may further include a sheet selecting mechanism configured to select the type of sheet to be used. In this case, the extra sheet supplying mechanism and the first ejection tray are selected when the sheet selecting mechanism selects a thick sheet. The extra sheet supplying mechanism may include a manual sheet insertion tray.

The image forming apparatus of the first example may further include a sensor for detecting when the manual sheet insertion tray is accessed by a user. In this case, the extra sheet supplying mechanism and the first ejection tray are selected when the sensor detects that the user accesses the manual sheet insertion tray.

The first image carrying member may transfer an image on odd-numbered pages onto an upper surface of the recording sheet and, at the same time, the second ejection tray transfers an image on even-numbered pages onto a lower surface of the recording sheet when the second ejection tray is selected in a double-sided recording mode so that the second ejection tray stacks a plurality of the recording sheets in increasing order of page numbers.

The first image carrying member may transfer a first image onto a first surface of the recording sheet and the second image carrying member may transfer a second image onto a second surface of the recording sheet in response to a selection made by the tray selecting mechanism between the first and second ejection trays.

The mode selecting mechanism, the tray selecting mechanism, the sheet selecting mechanism, and the cassette selecting mechanism may be mounted on a control panel of the apparatus.

In the image forming apparatus of the first example, selections of a single-sided recording mode and the double-sided recording mode, the first and second ejection trays, and the type of sheet to be used may be made from an external host system.

In the image forming apparatus of the first example, a selection of the plurality of sheet supplying mechanisms may be made from an external host system.

The first image carrying member may have a property of photoconductivity and may carry a toner image made in accordance with an electrophotographic method. The second image carrying member may carry a toner image transferred from the first image carrying member.

The present invention further provides a second example of an image forming apparatus which includes an image reading mechanism, an image forming mechanism, a plurality of ejection trays, a plurality of sheet cassettes, and a sheet transferring mechanism. The image reading mechanism is configured to read an original. The image forming mechanism is configured to perform an image recording operation including image forming, image carrying, and image transferring processes. The sheet transferring mechanism is configured to transfer a recording sheet from one of the plurality of sheet cassettes to a nip formed between the first and second image carrying members. In the image forming apparatus of the second example, the image forming mechanism performs an image recording operation in response to a selection of one of the plurality of ejection trays in accordance with images from originals read by the image reading mechanism either in single-sided or double-sided recording modes so that the plurality of ejection trays stack a stack of recording sheets in increasing order of page numbers.

The image forming mechanism may form a toner image in accordance with an electrophotographic method. In this case, the image forming mechanism includes first and second image carrying members. The first image carrying member is configured to form a toner image and to carry it thereon in increasing order of page numbers starting from a first page. The second image carrying member is configured to carry the toner image transferred from the first image carrying member. The first image carrying member transfers the toner image to a first side of a recording sheet and the second image carrying member transfers the toner image to a second side of the recording sheet.

The plurality of ejection trays may include a first ejection tray configured to stack a plurality of output sheets in a forward orientation and a second ejection tray configured to stack a plurality of output sheets in a reversed orientation.

The stack of recording sheets, stacked in increasing order of page numbers, may be a stack of recording sheets recorded in the single-sided recording mode or in the double-sided recording mode.

The image reading mechanism may read an image on a side of a single-sided original in a single-sided reading mode and images on both the first and second sides of a double-sided original in a double-sided reading mode.

The image forming mechanism may record images, in the single-sided recording mode, and outputs, in increasing order of page numbers, when the images are read in the double-sided reading mode by the reading mechanism.

The image forming mechanism may record images, in the double-sided recording mode, and outputs, in increasing order of page numbers, when the images are read in the double-sided reading mode by the reading mechanism.

The image reading mechanism may read images on both the first and second sides of a double-sided original via a one time sheet transferring process by moving the double-sided original.

The image reading mechanism may include a first image reading unit, configured to read an image of an original by moving the original, and a second image reading unit, configured to read an image of an original by holding the original at a predetermined position.

The second image reading unit may include a moving member that moves under a contact glass and is used as a part of the first image reading unit on the condition that the moving member is stopped.

The second image reading unit may be usable when originals are placed on a sheet tray of the first image reading unit.

The image reading mechanism may include a sheet reversing mechanism and may read images on both the first and second sides of an original.

The image reading mechanism may include a detector for detecting when an image being read is white in color and cancels reading the image when the image is detected as a blank white page.

In the image forming apparatus of the second example, one of the plurality of ejection trays may be formed in a space between the image reading mechanism and the image forming mechanism.

The image reading mechanism may include a tray for ejecting originals. In this case, the tray has a size within a projection area of the apparatus.

In the image forming apparatus of the second example, a recording sheet may be transferred in an approximately straight line from a first sheet cassette of the plurality of sheet cassettes to a first ejection tray of the plurality of ejection trays, wherein the first sheet cassette of the plurality of sheet cassettes may be a manual sheet inserting tray.

The image forming apparatus of the second example may further include a control panel close to the image reading mechanism. The control panel includes a selecting mechanism configured to select either a single-sided recording mode or a double-sided recording mode and a selecting mechanism configured to select one of the plurality of ejection trays.

The image forming mechanism may form images in increasing order of corresponding sheet numbers.

The image forming mechanism may form a plurality of images in increasing order of page numbers when the image reading mechanism reads the plurality of images in increasing order of page numbers.

The first image carrying member may have a property of photoconductivity and the second image carrying member may be a belt-shaped intermediate transfer member having a surface resistance in a range of from $10^5$ $\Omega$ to $10^{12}$ $\Omega$.

The image forming apparatus of the second example may further include a fixing mechanism configured to fix images attached on both the first and second sides of a recording sheet, while the recording sheet is supported by the belt-shaped intermediate transfer member.

The belt-shaped intermediate transfer member may be made of a heat resistant material.

The image forming mechanism may perform the image recording operation in accordance with image information sent from an external host system. Either a single-sided recording mode or a double-sided recording mode may be selected by the external host system. One of the plurality of ejection trays may be selected by the external host system.

The image forming apparatus of the second example may further include an external ejection tray unit that includes a connecting sheet path connected to a sheet path of the apparatus for turning and ejecting a recording sheet sent from the image forming mechanism into a first ejection tray of the plurality of ejection trays. In this case, the external ejection tray unit stacks a plurality of recording sheet in increasing order of page numbers. The connecting sheet path may be arranged along an edge portion of the first ejection tray of the plurality of ejection trays.

The image forming apparatus of the second example may further include a switching pawl configured to selectively switch between sending a recording sheet to the first ejection tray of the plurality of ejection trays and sending a recording sheet to the external ejection tray unit.

The image forming apparatus of the second example may further include another external ejection tray unit which includes a connecting sheet path connected to a sheet path of the apparatus for ejecting a recording sheet sent from the image forming mechanism in an approximately straight manner into one of the plurality of ejection trays. In this case, the external ejection tray unit stacks a plurality of recording sheets in increasing order of page numbers.

The present invention provides a method for image forming. In a first example, an image forming method includes the steps of: selecting either a single-sided or a double-sided recording mode; choosing the stack to be either face-down or face-up; inputting a plurality of images in increasing order of page numbers; performing a double-sided recording operation, when the double-side recording mode is selected, by forming first and second successive images in increasing order of corresponding sheet numbers, transferring the first and second successive images onto both the first and second surfaces of a recording sheet, fixing the first and second successive images attached on both the first and second surfaces, respectively, of the recording sheet, and stacking the recording sheet in an orientation in accordance with a choice chosen by the choosing step; repeating the performing step until the images input by the inputting step are recorded; executing a single-sided recording operation, when the single-sided recording mode is selected, by forming images in increasing order of corresponding sheet numbers, transferring the image onto a first surface of a recording sheet, fixing the image attached onto the first surface of the recording sheet, and stacking the recording sheet in an orientation in accordance with a choice chosen by the choosing step; and repeating the executing step until the images input by the inputting step are recorded.

The inputting step may read a plurality of originals and generate data of a plurality of images.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawings, wherein:

FIG. 9 is a table for explaining relationships between various manners of image reading and various manners of image forming performed by the image forming apparatuses of FIGS. 5 and 8;

DETAILED DESCRIPTION OF THE PREFERRED EMBODIMENTS

Figure 1:
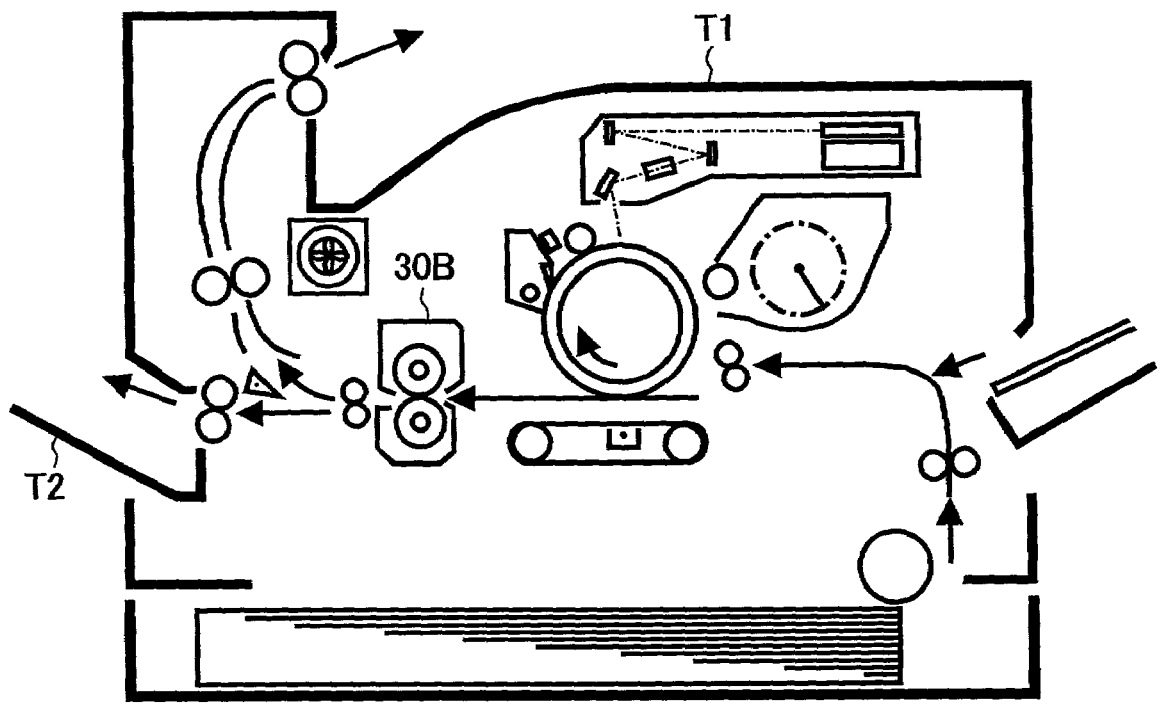
FIG. 1 is a cross-sectional view of a conventional image forming apparatus.

In describing preferred embodiments illustrated in the drawings, specific terminology is employed for the sake of clarity. However, the present invention is not intended to be limited to the specific terminology so selected and it is to be understood that each specific element includes all technical equivalents which operate in a similar manner.

Figure 2:
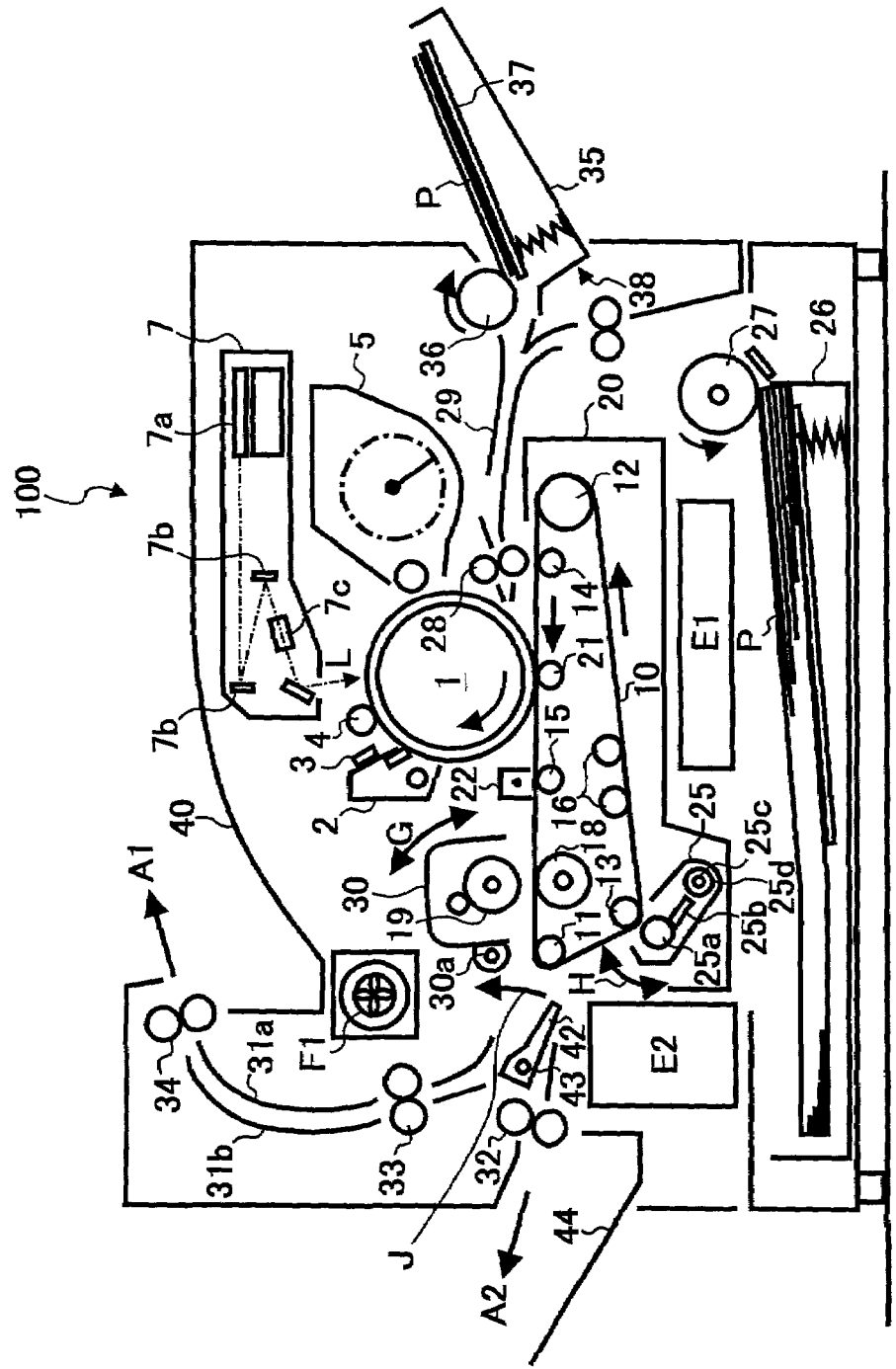
FIG. 2 is a cross-sectional view of a printer according to an embodiment of the present invention.

Referring now to the drawing, wherein like reference numeral designate identical or corresponding parts throughout the several views, FIG. 2 illustrates a printer 100 according to an embodiment of the present invention. Like the printer shown in FIG. 1, the printer 100 shown in FIG. 2 has a photoconductive drum 1 at its approximate center, wherein the photoconductive drum 1 serves as a first image carrying member. The printer 100 is further provided with various components, which are located around the photoconductive drum 1, including: a cleaning unit 2; a discharging unit 3; a charging unit 4; and a development unit 5. An exposure unit 7 is provided at a position above the photoconductive drum 1. The exposure unit 7 emits a laser beam L in a predetermined direction so as to be between the charging unit 4 and the development unit 5 in order to impinge on the surface of the photoconductive drum 1 at a writing position.

The photoconductive drum 1, the cleaning unit 2, the discharging unit 3, the charging unit 4, and the development unit 5 are assembled into a single unit (hereinafter referred to as a process cartridge) within the printer 100. The process cartridge can be exchanged at any time when its contents are consumed and its useful life is over.

The printer 100 is further provided with a belt unit 20 located at a position under the photoconductive drum 1. The belt unit 20 includes an intermediate transfer belt 10, serving as a second image carrying member, which contacts the photoconductive drum 1. The intermediate transfer belt 10 extends, under pressure, between rollers 11, 12, and 13 and the intermediate transfer belt 10 rotates in a counterclockwise direction. The intermediate transfer belt 10 has electrical resistance properties so that toner can be transferred thereto. The intermediate transfer belt 10 also has heat resistance properties. In this example, the intermediate transfer belt 10 has a surface resistance in a range of from approximately $10^5$ Ω to approximately $10^{12}$ Ω.

Rollers 14 and 15, cooling rollers 16, lower fixing roller 18, and first transfer mechanism 21 are provided inside of the intermediate transfer belt 10. Rollers 14 and 15 help support the intermediate transfer belt 10, while cooling rollers 16 cool the intermediate transfer belt 10. The lower fixing roller 18 includes a heat source, such as a heater, for fixing a toner image onto a first surface of a recording sheet, after the toner image has been transferred onto the first surface of the recording sheet. The first transfer mechanism 21 is arranged at a position opposite of the photoconductive drum 1, relative to the intermediate transfer belt 10, so as to transfer a toner image, formed on the photoconductive drum 1, onto the intermediate transfer belt 10 or a first surface of a recording sheet.

A second transfer mechanism 22, a fixing unit 30, and a belt cleaning unit 25 are arranged at various positions around the intermediate transfer belt 10. The fixing unit 30 includes an upper fixing roller 19 having a heat source, such as a heater, inside thereof. The upper fixing roller 19 fixes a toner image onto the second surface of the recording sheet, after the toner image has been first transferred onto the second surface of a recording sheet. The fixing unit 30 is held so as to be movable about a fulcrum 30a. Thus, the fixing unit 30 can be tilted back and forth in directions shown by double-sided arrow G with a mechanism (not shown) so as to contact the lower fixing roller 18, under pressure, and then move away from the lower fixing roller 18. Ventilation inside of the printer 100 is performed by fan F1 which is provided at a position to a left of and above the fixing unit 30.

The belt cleaning unit 25 is provided with a cleaning roller 25a, a cleaning blade 25b, a toner transfer mechanism 25c, and a pivot shaft 25d located inside thereof so as to clean residual toner off the surface of the intermediate transfer belt 10. The residual toner accumulated in the belt cleaning unit 25 is transferred with the toner transfer mechanism 25c to a toner collection container (not shown). The belt cleaning unit 25 is tilted about the pivot shaft 25d back and forth in directions shown by double-sided arrow H with a mechanism (not shown) so as to contact and move away from the intermediate transfer belt 10.

A sheet cassette 26, which contains a plurality of recording sheets P, is provided at a lower part of the printer 100.

The sheet cassette 26 is configured so as to be insertable and removable from the printer 100. As shown in FIG. 2, the sheet cassette 26 is inserted by being pushed to the right and removed by being pulled to the left. A sheet feeding roller 27 is provided at a position close to and above the leading edge of the sheet cassette 26 in a sheet transfer direction, i.e., towards the right in FIG. 2. A pair of registration rollers 28 are arranged at a position to the right of the photoconductive drum 1 and a guide member 29 is provided to guide a recording sheet P to a transfer position from the registration rollers 28. Above the sheet cassette 26, an electric unit E1 and a control unit E2 are arranged. A manual sheet inlet 35, which includes a plate 37 on which a plurality of recording sheets P may be placed, is provided on a right-hand side of the printer 100 and a sheet feeding roller 36 is arranged at a position such as to feed a recording sheet P placed on the plate 37. A recording sheet P, inserted from the manual sheet inlet 35, is guided to the registration rollers 28 by the guide member 29.

A switching pawl 42 is provided at a position to the left of the fixing unit 30. The switching pawl 42 is turned about a pivot 43 with an actuator (not shown), such as a solenoid, to switch a transfer direction of the recording sheet P sent from the belt unit 20 to a stacking portion 40 formed on the upper surface of the printer 100 or to an ejection tray 44 provided at a left-hand side of the printer 100. The recording sheet P is sent to the stacker 40 when the switching pawl 42 is set at a position, as shown in FIG. 2, and is sent to the ejection tray 44 when the switching pawl 42 is turned in the direction of arrow J.

A pair of transfer rollers 33, for transferring the recording sheet P, are provided above the switching pawl 42 and a pair of ejection rollers 34, for ejecting the recording sheet P to the stacker 40, are provided above the transfer rollers 33. Guide members 31a and 31b are arranged between the transfer rollers 33 and the ejection rollers 34. A pair of ejection rollers 32, for ejecting the recording sheet P to the ejection tray 44, are arranged at a position to the left of the switching pawl 42.

The printer 100 of FIG. 2, which is structured in the above-described way, performs an image forming operation in which images are recorded on both the first and second surfaces of a recording sheet P, in the following manner. In this discussion, an image to be formed first is referred to as a first image and an image to be formed second is referred to as a second image. Further, a surface of the recording sheet P, on which a first image is printed, is referred to as a first surface of the recording sheet P and the second surface, on which a second image is printed, is referred to as a second surface of the recording sheet P.

The printer 100 receives signals from an external host system (not shown), such as a computer, and forms images with the exposure unit 7 in accordance with the signals. Light, from a laser light source of the exposure unit 7, is continuously reflected by a motor-driven rotary polygonal mirror 7a and, via mirrors 7b and lens 7c, impinges on the charged surface of the photoconductive drum 1. Thereby, an electrostatic latent image is formed on the photoconductive drum 1 in accordance with the received signals.

The above electrostatic latent image is developed with toner by the development unit 5 into a visual toner image and is held on the photoconductive drum 1. For the sake of convenience, this toner image is referred to as the first toner image. The first toner image is then transferred by an action of the first transfer mechanism 21 onto the intermediate transfer belt 10 which is rotated in synchronism with the photoconductive drum 1. After the transfer process, the toner, remaining on the surface of the photoconductive drum 1, is removed by the cleaning unit 2 and the charge thereon is discharged by the discharging unit 3. The photoconductive drum 1 is thus prepared for a next job cycle of image forming.

The intermediate transfer belt 10 is rotated counterclockwise, as shown in FIG. 2, while carrying the first toner image which is to be transferred onto a first surface of the recording sheet P. During this process, the second transfer mechanism 22, the fixing unit 30, and the belt cleaning unit 25 are controlled so as to be kept in an inoperable position. In other words, electric inputs are cut off from the second transfer mechanism 22, the fixing unit 30, and the belt cleaning unit 25 or else, these components are moved away from the intermediate transfer belt 10.

A process for forming a second toner image, in a similar manner to that described above on the photoconductive drum 1, is started when the intermediate transfer belt 10, which carries the first toner image, is advanced to a predetermined position. At the same time, the recording sheet P starts to be transferred from the sheet cassette 26 or from the manual sheet inlet 35. When the sheet feeding roller 27 or 36 is rotated in either a counterclockwise direction or a clockwise direction, respectively, as shown by the arrows in FIG. 2, an uppermost recording sheet P is transferred towards the registration rollers 28.

As the intermediate transfer belt 10, which is moved in synchronism with the photoconductive drum 1, rotates, the first toner image, carried on the intermediate transfer belt 10, is advanced to a position where the intermediate transfer belt 10 contacts the photoconductive drum 1.

The recording sheet P is advanced by the registration rollers 28 to a contact position between the photoconductive drum 1 and the intermediate transfer belt 10 such that the second surface of the recording sheet P contacts the surface of the photoconductive drum 1. Then, the second toner image, which is formed on the photoconductive drum 1, is transferred onto the second surface of the recording sheet P by the first transfer mechanism 21. During this process, the recording sheet P is transferred by the registration rollers 28 such that the second toner image is transferred onto a proper position on the second surface of the recording sheet P.

During a time when the second toner image is transferred from the photoconductive drum 1 to the second surface of the recording sheet, the first surface of the recording sheet P contacts the surface of the intermediate transfer belt 10 on which the first toner image is carried. When the recording sheet P passes through a transfer region of the second transfer mechanism 22, a voltage is applied to the second transfer mechanism so that the first toner image is transferred onto the first surface of the recording sheet P.

Thus, the first and second images are attached to the first and second surfaces, respectively, of the recording sheet P. The recording sheet P is further transported to a fixing region of the fixing unit 30 by the intermediate transfer belt 10. The fixing unit 30 moves slightly downwardly so that the upper fixing roller 19 is pressed into contact with the lower fixing roller 18 and the intermediate transfer belt 10 is held therebetween. Thereby, the first and second toner images are fixed to the first and second surfaces, respectively, at the same time. After the transfer process, the recording sheet P is kept in contact with the intermediate transfer belt 10 so that the toner images can be kept in a desirably fixed state, without wobbling.

After the fixing process, the recording sheet P is separated from the intermediate transfer belt 10 at the roller 11 due to a relationship between a stiffness of the recording sheet P and a curvature of the roller 11. The recording sheet P is further transferred to either the stacker 40 or the ejection tray 44 depending upon the position of the switching pawl 42.

When the recording sheet P is output to the stacker 40, the first surface of the recording sheet P faces down in the stacker 40. Therefore, when stacking in increasing page number order is desired, the second toner image needs to be generated first and retained on the intermediate transfer belt 10 and the first toner image needs to be generated after the second toner image and then, transferred onto the recording sheet P directly from the photoconductive drum 1. In other words, the first toner image is to be recorded on the second page and the second toner image is to be recorded on the first page of the recording sheet P. For the third page and onwards, this sequential order needs to be maintained in the same manner. That is, when an even page number has an image thereon, this image is first generated and preserved on the intermediate transfer belt 10 and an image, on the following odd page number, is then generated so as to be transferred from the photoconductive drum 1 to the recording sheet P. In this case, the sequential order of the page numbers of the image forming operation is as follows:

2→1→4→3→6→5→ . . . .

In addition, the output order of the sheet numbers of the recording sheets P is as follows:

1st sheet→2nd sheet→3rd sheet→ . . . .

That is, the image forming operation is performed in increasing order of sheet numbers. For example, the first and second pages are recorded on the first sheet, the third and fourth pages are recorded on the second sheet, the fifth and sixth pages are recorded on the third sheet, and so on.

Some other image forming apparatuses perform the image forming in a reverse order, i.e., images of the last page and the page before the last page are recorded on the sheet which is output first. This sheet may be referred to as the first sheet in relation to these apparatuses. However, in the printer 100, the first sheet in a double-sided recording operation is defined as a sheet on which images of the first and second pages are recorded, but not as a sheet which is first output. In a single-sided recording operation, the first sheet is defined as a sheet on which the first page is recorded. The term double-sided recording operation means a recording mode in which recording is performed on both the first and second sides of a recording sheet. The term single-sided recording operation means a recording mode in which recording is preformed on a single side of a recording sheet.

When the recording sheet P is ejected to the ejection tray 44, the second surface, which has the second toner image from the photoconductive drum 1, faces upwardly. Therefore, when stacking in increasing page number order is desired in the ejection tray 44, the first toner image needs to be generated first and retained on the intermediate transfer belt 10 and then, the second toner image needs to generated afterwards and transferred onto the recording sheet P directly from the photoconductive drum 1. It must be arranged that the first toner image is recorded on the first page and the second toner image is recorded on the second page of the recording sheet P. This sequential order is maintained in the same manner for the third page and onwards. That is, when an odd-numbered page has an image thereon, this image is generated first and preserved on the intermediate transfer belt 10 and an image of the following even-numbered page is then generated afterwards so as to be transferred from the photoconductive drum 1 to the recording sheet P. In this case, the sequential order of the page numbers of the image forming is as follows:

1→2→3→4→5→6→ . . . .

In addition, an output order of the sheet numbers of the recording sheets P is as follows:

1st sheet→2nd sheet→3rd sheet→ . . . .

That is, the image forming is performed in increasing order of sheet numbers, as is the case with the stacking in the stacker 40.

In either case of stacking in the stacker 40 or in the ejection tray 44, the image forming operation is performed in increasing order of sheet numbers so that the user can easily find any sheet. In many cases, the user may instantly check if the image forming operation is being performed in a manner desired by the user by particularly reviewing the first page or the first few pages. When the image forming operation is performed in decreasing order of sheet numbers, i.e., the last sheet having the last page is output first, the user needs to wait until the first sheet having the first page thereon is output.

In addition, when an image forming operation is performed in increasing order of sheet numbers, the handling of the sheets is facilitated when a paper jam occurs in the printer 100. After eliminating the conditions leading to the paper jam, the user simply needs to instruct the printer 100 to start the image forming operation from the page including the jammed sheet. This kind of paper jam handling would help the user, particularly, when the printer 100 is in a mode in which the process of eliminating an error condition by the paper jam is not automated and the user is required to cope with the problem.

Figure 3:
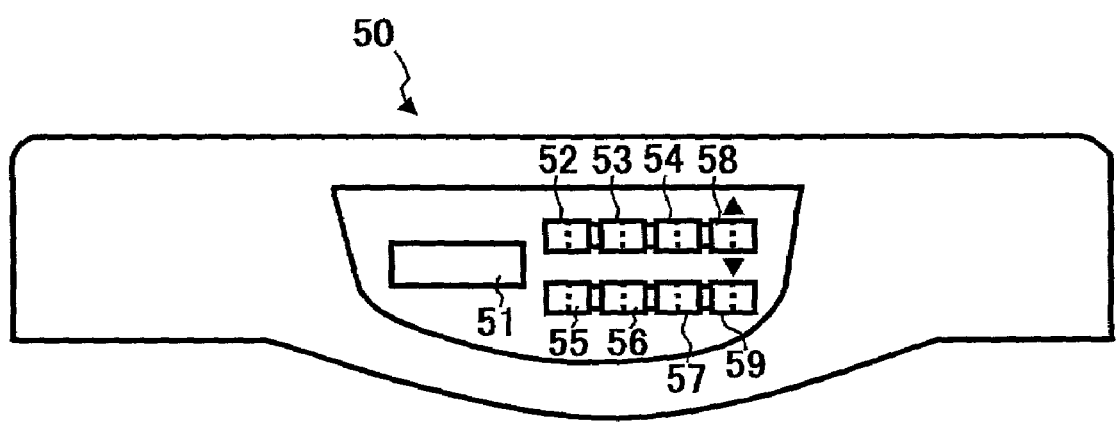
FIG. 3 is a top plan view of a control panel of the printer of FIG. 2.

In the printer 100, during a double-sided recording mode, the user can select either the stacker 40 or the ejection tray 44 via a control panel 50 (to be explained in more detail below), as shown in FIG. 3. During a double-side recording mode, when the user selects either one of the stacker 40 and the ejection tray 44, the image forming operation is controlled so as to be performed in the above-described sequence and thus, the recording sheets P are ejected to the designated place in increasing order of sheet numbers. Controlling the order of the image forming operation, according to the order of sheet numbers, is performed by a control unit (not shown).

Accordingly, the user simply needs to select one of the stacker 40 and the ejection tray 44 without paying attention to a relationship between the order of sheet numbers and the order of the image forming operation. Thus, the printer 100 can perform the double-sided recording operation without requiring the user to perform complex tasks. The order of the image forming operation can be switched from one to another with a known technique associated with storage of image data into a memory.

In the printer 100, when the recording sheet P is transferred from the manual sheet inlet 35 to the ejection tray 44, the recording sheet P passes through the printer 100 in an approximately straight manner. Therefore, a thick sheet, such as a thick paper sheet, an overhead-projector sheet, etc., is preferably inserted into the manual sheet inlet 35 and is ejected to the ejection tray 44 through an approximately straight passage. Thus, the thick sheets can be processed in the double-sided recording mode and be output in the appropriate page number order, without causing problems of being too thick while passing through the printer 100.

As for a standard sheet, it can be sent from either the sheet cassette 26 or the manual sheet inlet 35 and be ejected to either the stacker 40 or the ejection tray 44. In this case, the sheets can be output in the double-sided recording mode in the appropriate page number order. This sequence may be set as a default since the standard sheet is normally a frequently used sheet.

In a typical image forming operation, a mirror image is formed on the photoconductive drum 1 and is directly transferred onto the recording sheet P, thereby turning into a normal image. However, when the intermediate transfer belt 10 is involved, that is, the mirror image on the photoconductive drum 1 is transferred to the intermediate transfer belt 10 and is transferred to the recording sheet P, the mirror image is formed on the recording sheet P. Therefore, a normal image is formed on the photoconductive drum 1 for the first surface of the recording sheet P and a mirror image is formed on the photoconductive drum 1 for the second surface of the recording sheet P. This image alternation in a normal or mirror mode can be performed by controlling the exposure unit 7 using a known image processing technique.

The belt cleaning unit 25, separated away from the intermediate transfer belt 10, is turned after the toner image is transferred onto the recording sheet P from the intermediate transfer belt 10 such that the cleaning roller 25a contacts the intermediate transfer belt 10. Thereby, the residual toner is removed from the intermediate transfer belt 10 and onto the cleaning roller 25a and is then scraped off the cleaning roller 25a by the cleaning blade 25b. The scraped toner is collected by the toner return mechanism 25c to the toner collection container (not shown). The residual toner, after having heat applied thereto by the lower and upper fixing rollers 18 and 19, is prone to be removed from the intermediate transfer belt 10 before it is cooled. Therefore, the belt cleaning unit 25 is preferably arranged upstream from the cooling rollers 16.

After the cleaning process, the intermediate transfer belt 10 passes through the cooling region where the cooling rollers 16 cool the intermediate transfer belt 10. As an alternative to the cooling rollers 16, a heat pipe may be arranged to contact the inside surface of the intermediate transfer belt 10 or an application of an air flow to the intermediate transfer belt 10, after the fixing process, may also be effective.

Next, procedures of the single-sided recording operation in the printer 100 will be explained. The procedure of a single-sided recording operation in which the stacker 40 is used is different from the procedure of a single-sided recording operation in which the ejection tray 44 is used. When the recording sheets P are output into the stacker 40, the process of transferring the toner image onto the intermediate transfer belt 10 is eliminated and the toner image formed on the photoconductive drum 1 is directly transferred onto the recording sheet P. In this case, the toner image on the photoconductive drum 1 is a mirror image and is transferred onto the recording sheet P in the form of a normal image.

In FIG. 2, the recording sheet P is fed to the contact position between the photoconductive drum 1 and the intermediate transfer belt 10 in synchronism with the movement of the toner image on the photoconductive drum 1 and the toner image is transferred onto the upper surface of the recording sheet P facing the photoconductive drum 1 by the action of the first transfer mechanism 21.

In this procedure, the second transfer mechanism 22 is not operated. The recording sheet P is moved with the intermediate transfer belt 10 and the toner image is fixed on the recording sheet P through the fixing unit 30. After that, the recording sheet P is separated away from the intermediate transfer belt 10 and is lifted upwardly along the switching pawl 42, the guide members 31a and 31b, the transfer rollers 33, and the ejection rollers 34. Then, the recording sheet P is ejected in the direction of arrow A1 so as to be ejected face down in the stacker 40. As a result, a plurality of the recording sheets P are stacked face down in increasing order of sheet numbers. That is, although the image forming is performed in increasing order of page numbers from the first page, the user can have the plurality of the recording sheet P in increasing order of page numbers with the first page on the top of the stack when removing the stack of the recording sheets P from the stacker 40. With this configuration, the sequential order of the page numbers the image forming operation is as follows:

1→2→3→4→5→6→ . . . .

In addition, the output order of the sheet numbers of the recording sheets P in this case is as follows:

1st sheet→2nd sheet→3rd sheet→ . . . .

When the ejection tray 44 is used to stack the recording sheets P, the toner image, formed on the photoconductive drum 1, is transferred onto the intermediate transfer belt 10 with the first transfer mechanism 21 and is turned with the rotation of the intermediate transfer belt 10. The recording sheet P is fed to the contact position, between the photoconductive drum 1 and the intermediate transfer belt 10, in synchronism with the movement of the toner image on the intermediate transfer belt 10. Then, the toner image, on the intermediate transfer belt 10, is transferred onto the lower surface of the recording sheet P by the second transfer mechanism 22. After that, the recording sheet P is separated away from the intermediate transfer belt 10 and is straightly transferred via the switching pawl 42 in the direction of the arrow A2 so as to be ejected face down in the ejection tray 44. As a result, a plurality of the recording sheets P are stacked face down in increasing order of page numbers. That is, although the image forming operation is performed in increasing order of page numbers starting with the first page, the user can have the plurality of recording sheets P in increasing order of page numbers starting with the first page on the top of the stack when removing the stack of the recording sheets P from the ejection tray 44. With this configuration, the sequential order of the page numbers of the image forming operation is as follows:

1→2→3→4→5→6→ . . . .

In addition, the output order of the sheet numbers of the recording sheets P is as follows:

1st sheet→2nd sheet→3rd sheet→ . . . .

As described above, in the single-sided recording operation, the same order of the page numbers in the image forming operation is applied to both cases of using the stacker 40 and the ejection tray 44 and the only difference between the two cases is that the toner image is transferred onto the upper surface or the lower surface of the recording sheet P.

In the printer 100, when using the single-sided recording mode, the user can select either the stacker 40 or the ejection tray 44 via the control panel 50 (to be explained in more detail below), as shown in FIG. 3. When using the single-sided recording mode, the user may select either one of the stacker 40 and the ejection tray 44, and then, the image forming operation is controlled to be performed in the above-described sequence so that the recording sheets P are ejected to the designated place in increasing order of sheet numbers. Accordingly, the user simply needs to select one of the stacker 40 and the ejection tray 44 without paying attention to a relationship between the order of sheet numbers and the order of the image forming operation. Thus, the printer 100 can perform the double-sided recording operation without requiring the user to perform any complex tasks.

In the single-sided recording mode, a thick sheet, such as a thick paper sheet, an overhead-projector sheet, etc., is preferably inserted in the manual sheet inlet 35 and is ejected to the ejection tray 44 through a fairly straight passage in the approximate middle of the image forming apparatus or printer 100. Thus, the thick sheets can also be processed in a single-sided recording operation and be output in the appropriate page number order, without causing problems in being run through the passage in the approximate middle of the image forming apparatus or printer 100.

As described above, in the printer 100, the recording sheets P are output in an increasing order of sheet numbers, such as the first page, the second page, the third page, and so on, in both the cases of a single-sided recording operation and a double-sided recording operation, regardless of whether the stacker 40 or the ejection tray 44 is selected. Therefore, in both cases, the user can easily check if the image forming operation is performed in a desired manner. In addition, in both cases of single-sided and double-sided recording operations, the user can easily instruct the printer 100 to restart the image forming operation upon the occurrence of an error, such as a paper jam.

FIG. 3 shows the control panel 50 provided on the printer 100. As shown in FIG. 3, the control panel 50 includes a liquid crystal display or LCD 51 and various function buttons. Among the various function buttons, an online button 52 switches the printer 100 between being in an online condition and an offline condition. A reset button 53 resets present conditions to default conditions. A sheet selection button 54 designates the type of recording sheet P to be used. For example, when an extraordinary type of sheet, such as a thick sheet is used, the sheet selection button 54 is pressed to allow selection of such sheet. A double-sided recording button 55 makes the double-sided recording mode effective. An input enabling button 56 enables various inputs. By pressing the input enabling button 56, various items can be displayed on the LCD 51. To find and select a desired item, an up-scrolling button 58, being a black triangular mark, scrolls the items displayed on the LCD 51 upwardly and a down-scrolling button 59, being a black triangular mark in a reversed direction from the above-described black triangular mark of the up-scrolling button 58, scrolls the items downwardly. An execution button 57 executes the designation of the selected item. The input enabling button 56 allows for the selection of the sheet feed unit (i.e., the sheet cassette 26 or the manual sheet inlet 35) and the selection of the output tray (i.e., the stacker 40 or the ejection tray 44).

In the printer 100, the double-sided recording mode is selected by a press of the double-sided recording button 55. During this selection, selection of the sheet cassette 26 and the manual sheet inlet 35 and selection of the stacker 40 and the ejection tray 44 can be performed with the input enabling button 56. This selection may also be performed in a combination of the sheet feed unit and the output tray. In the single-sided recording mode, selections of the sheet feed unit and the output tray are allowed.

With the above-described structure, the printer 100 can feed the recording sheets P from the designated sheet feed unit and output the recording sheets P to the designated output tray in an appropriate page number order in both the single-sided recording operation and the double-sided recording operation by properly designating the sheet feed unit and the output tray. Thus, the user can obtain the outputs in the page number order without paying attention to the order of the image forming operation relative to the sheet order.

As described above, when a thick sheet, such as a thick paper sheet, an overhead projector or OHP sheet, and so on, is used, such a sheet is preferably inserted from the manual sheet inlet 35 and is ejected to the ejection tray 44 so as to run along a straight passage in the approximate center of the printer 100. In the printer 100, the manual sheet inlet 35 and the ejection tray 44 are automatically selected when a thick sheet is selected with the sheet selection button 54. Accordingly, when the user desires outputs in increasing page number order using a thick sheet in either the single-sided recording mode or the double-sided recording mode, the user needs to select the thick sheet using the sheet selection button 54 without paying attention to the selections of the sheet feed unit and the output tray and to the order of the image forming operation relative to the sheet numbers.

In the printer 100, the stacker 40 is designated as a regular sheet feed unit in both the single-sided recording mode and the double-side recording mode when a regular sheet is selected to be used so that the recording sheets P are stacked in an appropriate increasing page number order in the stacker 40 where the user can easily take out the stack of the recording sheets P.

In this way, the output tray is automatically designated in accordance with the selection of the sheet type and the order of the image forming operation is controlled such that the recording sheets P are ejected to the designated output tray in the increasing page number order. Thus, the user can obtain the stack of the recording sheets P in the increasing page number order by simply selecting the type of the recording sheet P.

As shown in FIG. 2, the printer 100 is provided with a sensor 38 at a position inside of the printer 100 and close to the manual sheet inlet 35. The sensor 38 detects a condition of whether the manual sheet inlet 35 is closed or open. When the sensor 38 detects that the manual sheet inlet 35 is open, the printer 100 automatically selects the thick sheet mode and the ejection tray 44.

With this configuration, when the user decides to use recording sheets P that are thick, the user can simply place the thick recording sheets P at the manual sheet inlet 35 by first opening the manual sheet inlet 35 to reveal the plate 37 and then set the thick recording sheets P on the plate 37. Thus, after an image forming operation has been performed and a stack of recording sheets P, in an appropriate increasing page number order in the ejection tray 44, is obtained in both the single-sided recording mode or the double-sided recording mode.

In the printer 100, the switching of the sheet ejection passage is achieved by a simple mechanism using a single component, such as a switching pawl 42, which was described above.

In addition, the printer 100 allows the selections of various operating conditions from an external host system connected to the printer 100 as well as through the control panel 50, as was described with respect to FIG. 3 above. Accordingly, the user of the external host system can remotely select the sheet feed unit, the output tray, the sheet type, and so on.

Next, a color printer 100B, according to the embodiment of the present invention, will be explained with reference to FIG. 4. The color printer 100B is similar to the printer 100 of FIG. 2, except for a revolver type development unit 5R and a mechanism for moving the intermediate transfer belt 10 away from the photoconductive drum 1. Components having the same functions as those in the printer 100, shown in FIG. 2, are labeled with the same reference characters and will not be explained again, the following discussion being focused on the difference between the two printers.

Figure 4:
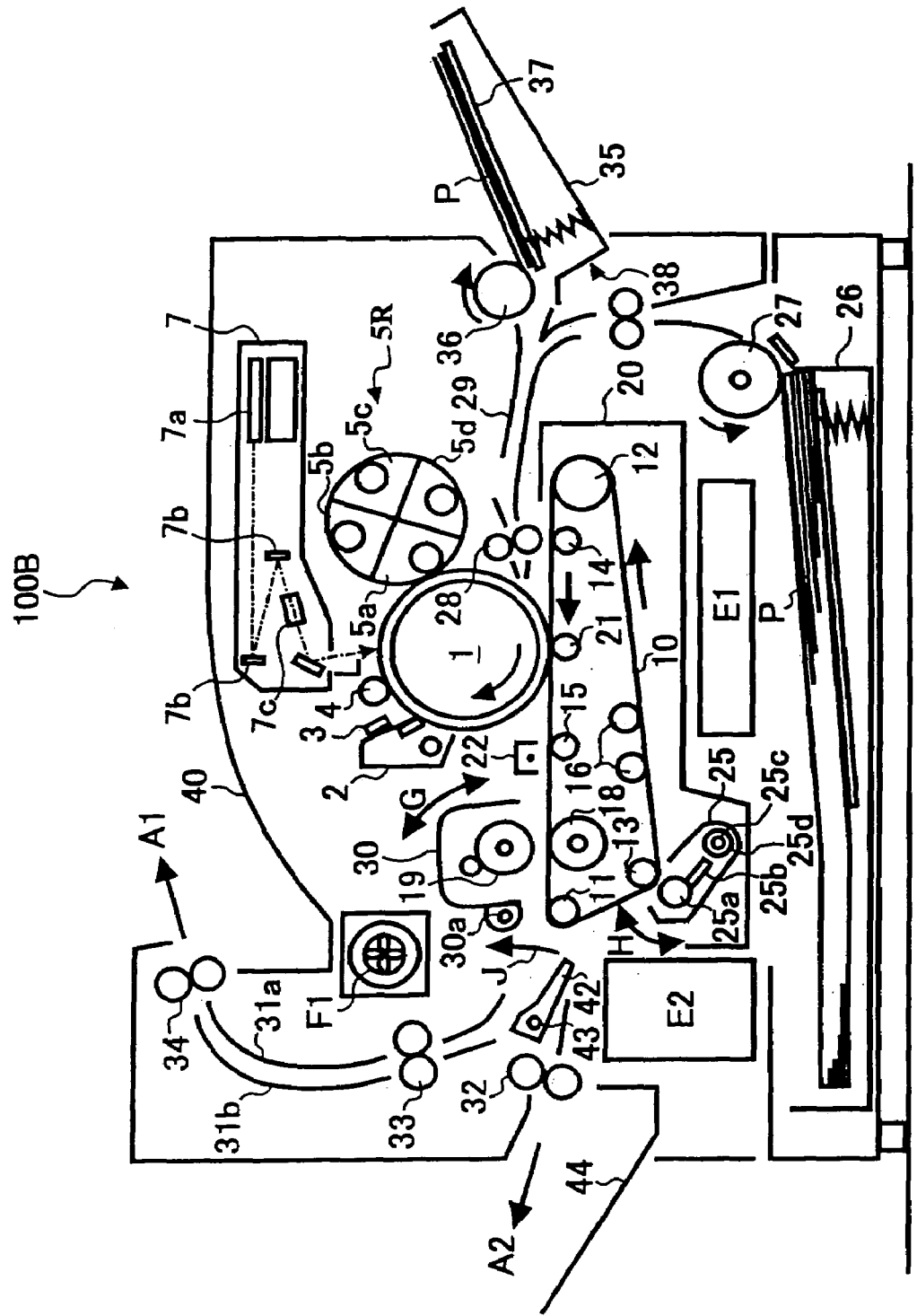
FIG. 4 is a cross-sectional view of a color printer according to the embodiment of the present invention.

As shown in FIG. 4, the revolver type development unit 5R is rotatable and includes development stations 5a–5d. The revolver type development unit 5R is rotated so as to switch the development stations 5a–5d from one to another so as to be located at a particular development position. The development stations 5a–5d contain color toners that enable a full color development. For example, the development stations 5a, 5b, 5c, and 5d contain yellow, magenta, cyan, and black toner, respectively. To form a mono-chrome toner image, the development station 5d is moved so as to be located at the development position and the image forming operation in the increasing page number order is performed in a manner similar to that performed by the printer 100 of FIG. 2.

To form a full color image, the exposure unit 7 is caused to generate light information to be developed with the yellow toner and to scan the charged surface of the photoconductive drum 1 with the light information so as to form an electrostatic latent image, while the intermediate transfer belt 10 is moved away and separated from the photoconductive drum 1. The development station 5a is moved to the development position and is activated to develop the electrostatic latent image with the yellow toner. Likewise, a magenta toner image is formed on the photoconductive drum 1 overlaying the yellow toner image. After that, a cyan toner image is generated to further overlay the yellow and the magenta toner images. Finally, a black toner image is formed and overlays all three of the yellow, magenta, and cyan toner images on the photoconductive drum 1. Thereby, a four color toner image is formed on the surface of the photoconductive drum 1 which is rotated four times during the generation of the four color toner image.

After a completion of the four color toner image, the intermediate transfer belt 10 is moved into contact with the photoconductive drum 1. At the same time, the recording sheet P is transferred, in synchronism with the movement of the four color toner image, to the contact position between the photoconductive drum 1 and the intermediate transfer belt 10. The four color toner image is then transferred onto the recording sheet P by the action of the first transfer mechanism 21.

In the double-sided recording mode, the intermediate transfer belt 10 is moved into contact with the photoconductive drum 1 when the first toner image is formed on the photoconductive drum 1 so that the first toner image is transferred onto the intermediate transfer belt 10 by the first transfer mechanism 21. The intermediate transfer belt 10 is then moved away and separated from the photoconductive drum 1 and is brought into a standby mode. After that, the second toner image, i.e., the second four color toner image, is formed on the photoconductive drum 1. When the second toner image is formed on the photoconductive drum 1, the intermediate transfer belt 10 is controlled in such a manner that the leading edge of the second toner image on the photoconductive drum 1 meets the leading edge of the first toner image on the intermediate transfer belt 10. The intermediate transfer belt 10 is moved into contact with the photoconductive drum 1 and the recording sheet P is fed to the contact position between the photoconductive drum 1 and the intermediate transfer belt 10 in synchronism with the movement of the second toner image on the photoconductive drum 1. The second toner image on the photoconductive drum 1 is transferred onto the second surface of the recording sheet P by the action of the first transfer mechanism 21 and the first toner image on the intermediate transfer belt 10 is transferred onto the first surface of the recording sheet P by the action of the second transfer mechanism 22. Thus, the first and second toner images are transferred onto the first and second surfaces of the recording sheet P. The recording sheet P is further transported, while in close contact with the intermediate transfer belt 10, to the fixing unit 30. In both single-sided and double-sided recording modes, processes occurring after the recording sheet P has been transferred to the fixing unit 30 are similar to those described in the operation of the printer 100 as shown in FIG. 2.

As in the case of the printer 100 of FIG. 2, the toner image generations are executed in an increasing order of page numbers and the recording sheets P are output in an increasing order of sheet numbers in both single-sided and double-sided recording modes in the color printer 100B, regardless of which output tray is selected. Therefore, the user can easily check whether the images are generated in a desired form and can easily handle the error conditions caused by, for instance, a paper jam.

As an alternative to the revolving type development unit 5R, the color printer 100B may include a tandem type development unit while performing the same function as described above. In this case, a photoconductive belt is used in place of the photoconductive drum 1 and a plurality of development stations included in the tandem type development unit are arranged along the photoconductive belt.

Figure 5:
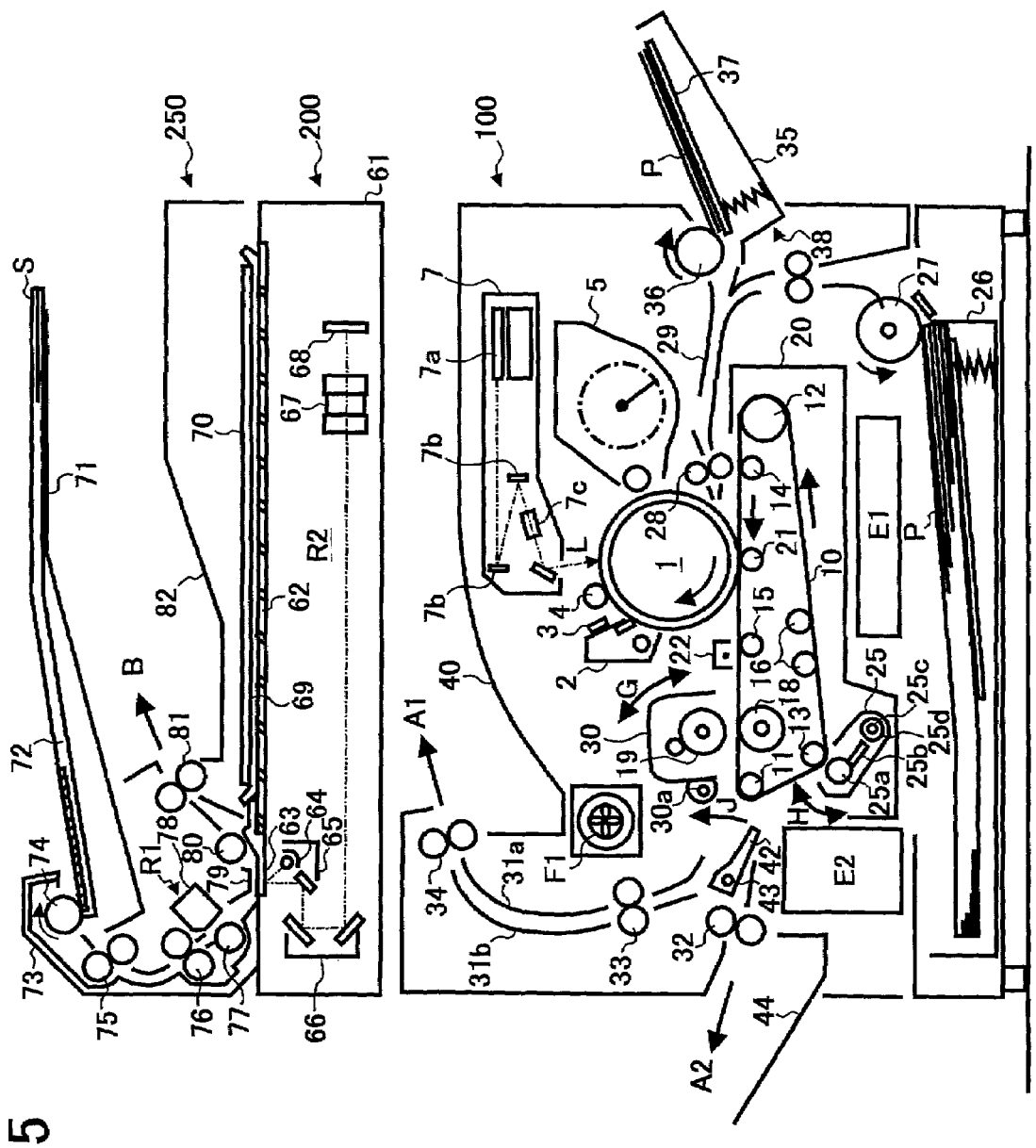
FIG. 5 is a cross-sectional view of an image forming apparatus, including the printer of FIG. 2, a scanner, and an automatic document feeder or ADF.

Next, an image forming apparatus, according to the present invention, is explained with reference to FIGS. 5–7. The image forming apparatus of FIG. 5 includes the printer 100 of FIG. 2 and a scanner 200. The scanner 200 is provided on the top thereof with an automatic document feeder or ADF 250, as shown in FIG. 5. The automatic document feeder or ADF 250 automatically feeds a sheet-formed original S which is placed on the automatic document feeder or ADF 250. The image forming apparatus of FIG. 5 can perform various functions including, copying the image of an original, transmitting the image of the original through a facsimile procedure, outputting data on a sheet in accordance with signals sent from an external computer, and so on.

Figure 6:
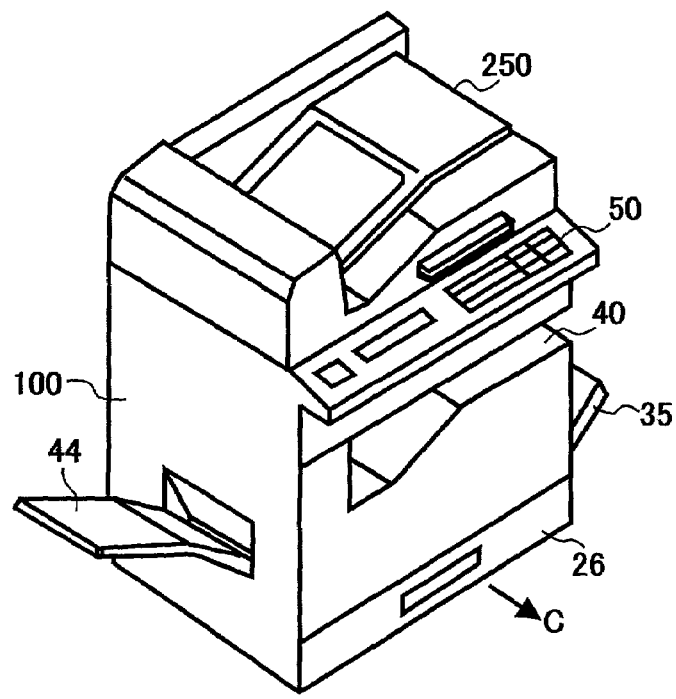
FIG. 6 is a perspective view of the image forming apparatus of FIG. 5.

FIG. 6 shows an external view of the image forming apparatus of FIG. 5. As shown in FIG. 6, the sheet cassette 26 is capable of being pulled out in a direction indicated by an arrow C. An upper part of the printer 100 serves as the stacker 40.

The scanner 200 is capable of performing either one of: a sheet scanning, in which an original is read, while being moved; and a book scanning, in which an original is read by a moving member. In the scanner 200, contact glasses 62 and 63 are arranged on an upper part of a frame 61. The contact glass 62 has a greater surface area than that of the contact glass 63 and the contact glass 62 is used as a plate on which an original is placed and read during a book scanning mode. The contact glass 63 is used when an original is read, as it is transferred by the automatic document feeder or ADF 250 in the sheet scanning mode.

Inside the scanner 200, a first moving member 65, which includes a light source 64 and mirrors, and a second moving member 66, which includes mirrors, are arranged so as to slide parallel to the contact glass 62. The scanner 200 employs a known optical system in which the first moving member 65 is moved at one half of the speed of the second moving member 66. In the book scanning mode, an original is read while the first and second moving members 65 and 66 are moved. In the sheet scanning mode, the first and second moving members 65 and 66 are stopped at positions, as shown in FIG. 5, and the original is read at a position of the contact glass 63 as the original is moved relative to the contact glass 63.

In both sheet and book scanning modes, an original is irradiated with light of the light source 64 and an image of the original is focused on a fixed lens 67 and is captured by a charge-coupled device or CCD 68, which then converts the captured light information into an analog signal. Based on this analog signal, digital image data is generated. After that, the digital image data is subjected to various kinds of signal processing so as to be used as facsimile information, print information to be printed on an image forming apparatus, such as the printer 100, image information to be edited by a computer, and so on.

The automatic document feeder or ADF 250 includes a sheet bed 71, on which a stack of originals to be read, are placed. The sheet bed 71 is provided with a moving plate 72. As shown in FIG. 5, a sheet transfer mechanism 73 of the automatic document feeder or ADF 250 is formed in a left side portion of the sheet bed 71. The sheet transfer mechanism 73 is provided with a sheet feeding roller 74 arranged at an upper surface of the moving plate 72, a pair of separation rollers 75, a pair of transfer rollers 76, an image sensor 78, a transfer roller 77 arranged at a position facing the image sensor 78, a sheet pressure plate 79, a transfer roller 80, and a pair of ejection rollers 81. Under the sheet bed 71, an ejection tray 82 is arranged and a space, between the sheet bed 71 and the ejection tray 82, is used as an ejection space. A pressure plate 70 is arranged under the ejection tray 82 and holds an original, placed on the contact glass 62, under pressure. A bottom surface of the pressure plate 70 is adhered with a white sheet 69. The upper portion of the automatic document feeder or ADF 250, including the pressure plate 70, is tilted upwardly so that the contact glasses 62 and 63 are exposed. The pressure plate 70 is configured to press a thick original such as a book. It is convenient to use the automatic document feeder or ADF 250 when originals are of sheet type. The automatic document feeder or ADF 250 is detachably mounted on the image forming apparatus.

A stack of sheet originals are placed on the moving plate 72 of the sheet bed 71 with the first page facing upwardly. The sheet feed roller 74 is rotated in a direction indicated by an arrow (i.e., clockwise in FIG. 5) so that the uppermost sheet in the stack of originals is transferred to the sheet transfer mechanism 73. The pair of separation rollers 75 feed the originals sheet by sheet. The original, fed from the moving plate 72, is transferred through a sheet path, via the transfer rollers 76, 77, and 80, to the ejection rollers 81, and is ejected in a direction B. Therefore, the original is stacked in the ejection tray 82 with the first page facing downwardly.

During the above process, the original passes by the image sensor 78 with the second surface facing a reading part of the image sensor 78 so that the image sensor 78 reads the second page. After passing by the image sensor 78, the original passes through a space between the sheet pressure plate 79 and the contact glass 63 with the first surface facing the contact glass 63 so that the scanner 200 reads the first page of the original. When the scanner 200 reads an original passing by the contact glass 63, the first and second moving members 65 and 66 are stopped at the reading position under the contact glass 63.

Thus, when the automatic document feeder or ADF 250 is used, the first and second surfaces of an original are read at two different positions during a time of sheet transfer. Hereinafter, a reading mechanism, that reads a moving original of sheet type, is referred to as a first reading mechanism R1 and a reading mechanism, that reads a stationary original with the moving members 65 and 66, is referred to as a second reading mechanism R2.

In FIG. 5, the first reading mechanism R1 is indicated as representing the image sensor 78 of the automatic document feeder or ADF 250 and the second reading mechanism R2 is indicated in the middle of the scanner 200. The scanner 200 is regarded as the second reading mechanism R2 when reading a stationary original pressed by the pressure plate 70. However, the scanner 200 is regarded as a part of the first reading mechanism R1 when an original of sheet type is read, while it is transferred by the automatic document feeder or ADF 250 with the moving members 65 and 66 stopped at the reading position under the contact glass 63. That is, the first reading mechanism R1 includes a part centered with the image sensor 78 of the automatic document feeder or ADF 250 and a part which is the scanner 200 with the moving members 65 and 66 stopped at the reading position under the contact glass 63.

When an original to be read is a transparent sheet, a color of the pressure plate may be read as a background. Therefore, the pressure plate 70 has the white sheet 69 adhered on the surface facing the original. Likewise, the transfer roller 77 and the sheet pressure plate 79 are made so as to be white in color.

Figure 7:
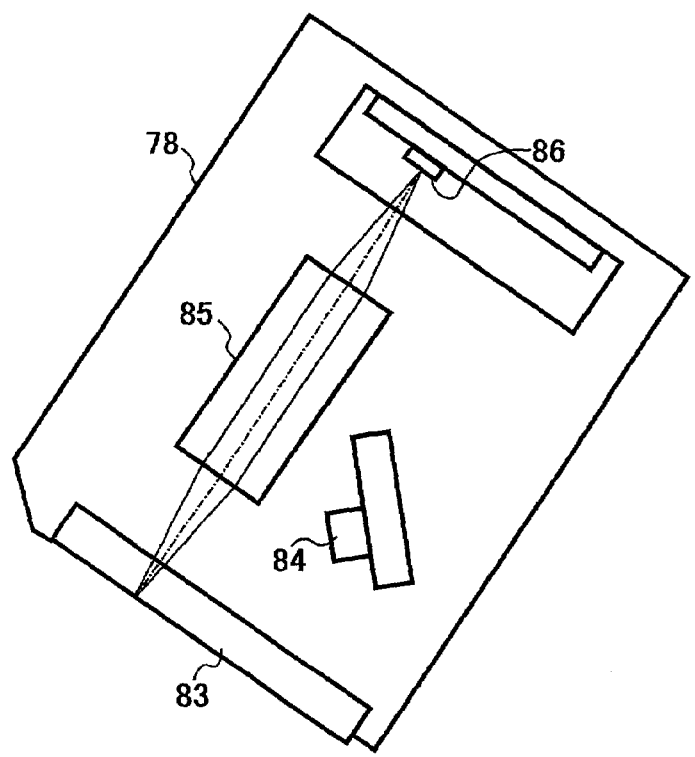
FIG. 7 is a cross-sectional view of an image sensor included in the automatic document feeder or ADF of FIG. 5.

FIG. 7 is a cross-sectional view of the image sensor 78. As shown in FIG. 7, the image sensor 78 includes a glass 83 facing an original, a light source 84 (i.e., a light emitting diode or LED) for lighting an image surface of an original, a lens array 85 for making an image in focus, and an equal magnification lens 86. A close-contact sensor, which requires no focusing lens, may be substituted for the image sensor 78.

When an original of a relatively thick book is placed on the second reading mechanism R2, the thick book is pressed by the pressure plate 70 and accordingly, the first reading mechanism R1 is lifted up. This leads to a separation of the sheet pressure plate 79 away from the contact glass 63. For this reason, the automatic document feeder or ADF 250 is provided with a sensor (not shown) for detecting when the sheet pressure plate 79 is moved away from the contact glass 63. Based on this detection, a use of the first reading mechanism R1 is inhibited.

When an emergency job, which includes both reading and image forming, occurs during a reading process of a sheet original with the first reading mechanism R1, the image forming apparatus of FIG. 5 allows an interruption due to such an emergency job even though the sheet original is present on the sheet bed 71 or the ejection tray 82. By the interruption, the second reading mechanism R2 is allowed to perform the reading of an original placed on the contact glass 62. The interruption is entered through the control panel 50 of FIG. 6.

Figure 8:
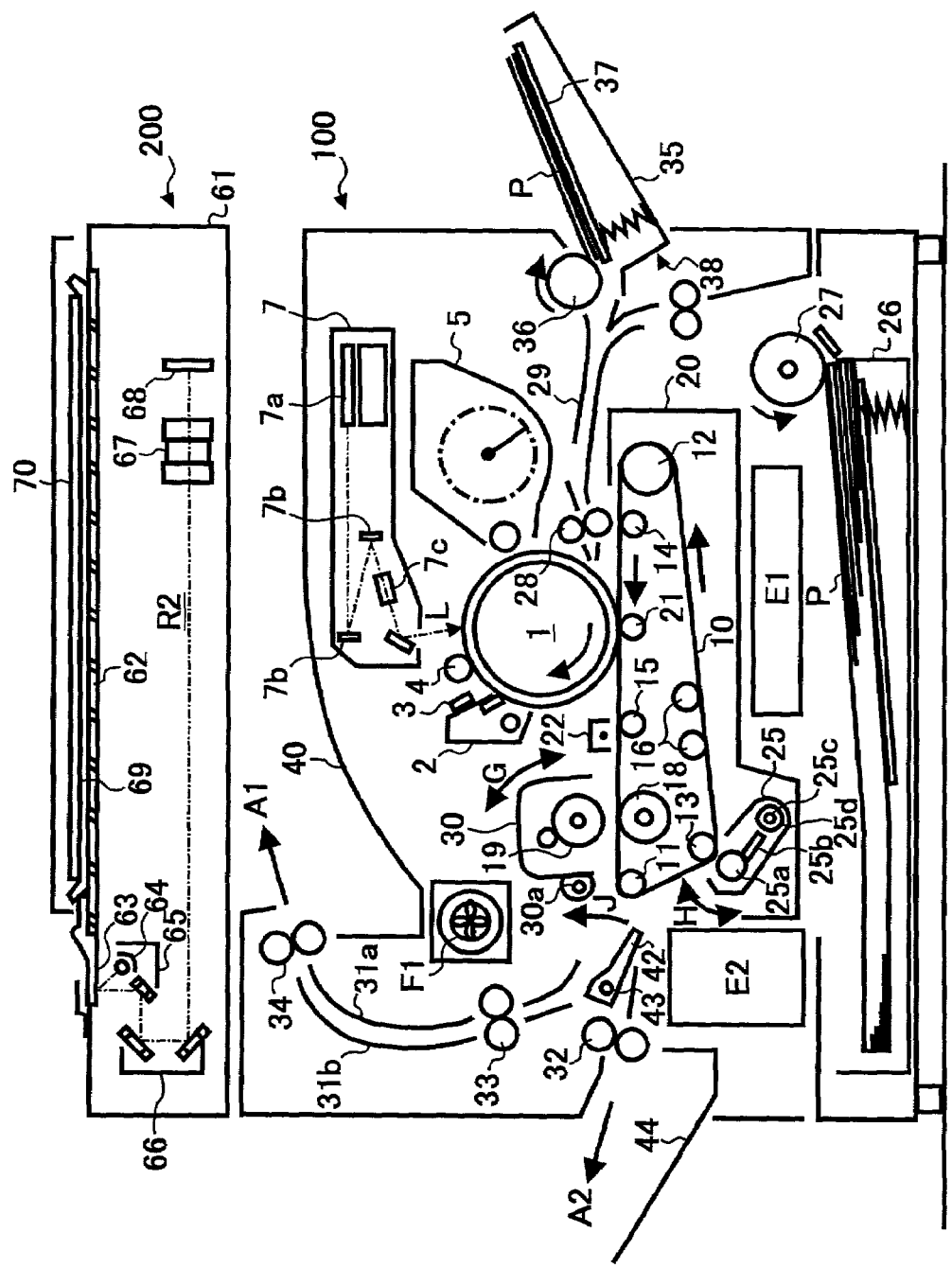
FIG. 8 is a cross-sectional view of an image forming apparatus of FIG. 5 without the Automatic document feeder or ADF.

FIG. 8 shows another image forming apparatus according to an embodiment of the present invention. As shown in FIG. 8, the image forming apparatus does not have the automatic document feeder or ADF 250. In accordance with the removal of the automatic document feeder or ADF 250, the pressure plate 70 is differently configured. Therefore, other than the removal of the automatic document feeder or ADF 250, the image forming apparatus of FIG. 8 is basically the same as that of FIG. 5. In the image forming apparatus of FIG. 8, the surface of the original facing the contact glass 62 is read by the second reading mechanism R2 during one scanning process, while both surfaces of the original can be read with the first and second reading mechanisms R1 and R2 during one transfer process in the image forming apparatus of FIG. 5. When an original is placed on the contact glass 62 in the image forming apparatus of FIG. 5, the surface of the original facing the contact glass 62 is read by the second reading mechanism R2 during one scanning process.

In both image forming apparatuses of FIGS. 5 and 8, the page orders of the recording sheets P stacked in the stacker 40 and the recording sheets P stacked in the ejection tray 44 are different, as described above. Accordingly, the image forming apparatuses of FIGS. 5 and 8 are configured to control the page order of the recording sheets P ejected either to the stacker 40 or the ejection tray 44 in a manner as described above when originals are read with either the first reading mechanism R1 or the second reading mechanism R2.

FIG. 9 is a table summarizing a relationship between manners of reading originals and manners of recording pages which are achieved by the image forming apparatuses of FIGS. 5 and 8. In the table of FIG. 9, an item I indicates which one of the first reading mechanism R1 and the second reading mechanism R2 is used and an item II indicates whether an original is single-sided, abbreviated as S—S, or double-sided, abbreviated as D-S. Further, an item III indicates an order of page reading, in which a page number, in brackets, indicates a blank page. Further, an item IV indicates which one of the stacker 40 and the ejection tray 44 is used and an item V indicates which one of the single-sided recording operation, abbreviated as S—S, and the double-sided recording operation, abbreviated as D-S, is performed. Further, an item VI indicates an order of page generation and an item VII indicates processes performed. In item VII, a process 1 transfers an image from the photoconductive drum 1 to the intermediate transfer belt 10, a process 2 transfers an image from the photoconductive drum 1 to the recording sheet P, and a process 3 transfers an image from the intermediate transfer belt 10 to the recording sheet P.

In the image forming apparatus of FIG. 8, a sheet path for ejecting the recording sheet P to the stacker 40 is configured to turn the recording sheet P so that the recording sheet P is ejected to the stacker 40 in a face down manner. This operation is referred to as a reverse ejection. A sheet path for ejecting the recording sheet P to the ejection tray 44 is configured to eject it in a straight or forward manner so that the recording sheets P are stacked in the ejection tray 44 in a face up manner. This operation is referred to as a straight or forward ejection. Therefore, in order to eject the recording sheets P in increasing order of page numbers, an order of generating pages is different between the cases of ejection to the stacker 40 and to the ejection tray 44.

The apparatus of FIG. 8 uses a method of double-sided recording in which two pages of images for the first and second surfaces are stored before starting the image forming process and both of the photoconductive drum 1 and the intermediate transfer belt 10 are effectively involved in the image forming process without being stopped.

In the table of FIG. 9, the reading manner a and b represent the sheet scanning mode of the image forming apparatus of FIG. 5 and the reading manner c and d represent the book scanning mode of the image forming apparatuses of FIGS. 5 and 8. In the reading manner b and d, the fourth page is a white page as so indicated.

The recording manner A and B represent the cases where the recording sheets P are ejected to the stacker 40 and the recording manner C and D represent the cases where the recording sheets P are ejected to the ejection tray 44.

In combining the above-described reading manners and recording manners, one can come up with sixteen different image reading and recording methods. Amongst the sixteen methods, when single-sided originals are read with the automatic document feeder or ADF 250 in the sheet scanning mode, the original is read by the charge-coupled device or CCD 68 under the conditions that the moving members 65 and 66 are stopped at the reading position under the contact glass 63 since the first page of the originals faces up in the sheet bed 71 of the automatic document feeder or ADF 250. When double-sided originals are read with the automatic document feeder or ADF 250 in the sheet scanning mode, the even-numbered page is read by the image sensor 78 and the odd-numbered page is read by the charge-coupled device or CCD 68 with the moving members 65 and 66 stopped at the reading position under the contact glass 63. When single-sided or double-sided originals are read sheet-by-sheet in the book scanning mode, the original is read by the charge-coupled device or CCD 68 moved with the moving members 65 and 66. In this case, the original placed on the contact glass 62 is manually turned.

Next, each of the sixteen methods is explained.

(1) In a method "Aa," single-sided originals are read with the first reading mechanism R1, the read images are in turn reproduced on the recording sheets P in the single-sided recording mode, and the single-sided recording sheets P are in turn ejected to the stacker 40. The originals are transferred by the automatic document feeder or ADF 250 sheet-by-sheet and are read in order of page numbers 1, 2, 3, 4, and so on. The images are formed on the photoconductive drum 1 in order of page numbers 1, 2, 3, 4, and so on. Each of the formed images is transferred from the photoconductive drum 1 to the recording sheet P (i.e., the process 2) and is ejected to the stacker 40. Thereby, the single-sided recording sheets P are stacked face down in the proper page number order.

Thus, the single-sided originals are read in increasing order of sheet numbers 1, 2, 3, and so on, and the resultant single-sided recording sheets P are output in increasing order of sheet numbers 1, 2, 3, and so on.

In reading the single-sided originals in increasing order of sheet numbers, the sheet that is first read is not called the first sheet but the sheet that has the first page is called the first sheet, as in the case of the recording process. Likewise, in reading double-sided originals, the sheet that has the first and second pages is called first sheet and the reading is performed in increasing order of page numbers and sheet numbers.

Some reading apparatuses are configured to read originals from the last sheet. Accordingly, the last page is first read and the reading is performed in decreasing order of page numbers. In these apparatuses, the sheet that is first read may be the first sheet although it has the last page.

(2) In a method "Ab," double-sided originals are read with the first reading mechanism R1, the read images are in turn reproduced on the recording sheets P in the single-sided recording mode, and the resultant single-sided recording sheets P are in turn ejected to the stacker 40. The originals are transferred by the automatic document feeder or ADF 250 sheet-by-sheet and are read in order of even-numbered and odd-numbered pages, such as 2, 1, 4, 3, and so on. This is because the image sensor 78, that reads even-numbered pages, is located upstream and the contact glass 63, that reads odd-numbered pages is located downstream. The images are formed on the photoconductive drum 1 in order of page numbers 1, 2, 3, 4, and so on. However, the fourth page is detected as a white page by the image sensor 78 and therefore, no image is formed for the fourth page. Each of the formed images is transferred from the photoconductive drum 1 to the recording sheet P (i.e., the process 2) and is ejected to the stacker 40. Thereby, the single-sided recording sheets P are stacked face down in the proper page order.

Thus, the double-sided originals are read in increasing order of sheet numbers 1, 2, 3, and so on, and the resultant single-sided recording sheets P are output in increasing order of sheet numbers 1, 2, 3, and so on.

(3) In a method "Ac," single-sided originals are read with the second reading mechanism R2, the read images are in turn reproduced on the recording sheets P in the single-sided recording mode, and the resultant single-sided recording sheets P are in turn ejected to the stacker 40. The single-sided originals are placed on the contact glass 62 sheet-by-sheet in a desired order, or in an increasing order of page numbers such as 1, 2, 3, 4, and so on, for example, by the user. The originals are then read with the second reading mechanism R2 in order of placements by the user, i.e., in increasing order of page numbers such as 1, 2, 3, 4, and so on. The images are formed on the photoconductive drum 1 in increasing order of page numbers 1, 2, 3, 4, and so on. Each of the formed images is transferred from the photoconductive drum 1 to the recording sheet P (i.e., the process 2) and is ejected to the stacker 40. Thereby, the single-sided recording sheets P are stacked face down in the proper page order.

Thus, the single-sided originals are read in increasing order of sheet numbers 1, 2, 3, and so on, and the resultant single-sided recording sheets P are output in increasing order of sheet numbers 1, 2, 3, and so on.

(4) In a method "Ad," double-sided originals are read with the second reading mechanism R2, the read images are in turn reproduced on the recording sheets P in the single-sided recording mode, and the resultant single-sided recording sheets P are in turn ejected to the stacker 40. The double-sided originals are placed on the contact glass 62 sheet-by-sheet in increasing order of page numbers, such as 1, 2, 3, 4, and so on, for example, by the user. The originals are then read with the second reading mechanism R2 in order of placement by the user, i.e., in increasing order of page numbers, such as 1, 2, 3, 4, and so on. The images are formed on the photoconductive drum 1 in order of page numbers 1, 2, 3, 4, and so on. However, since the fourth page is a white page, the user does not let it be read and therefore, no image is formed for the fourth page. Each of the formed images is transferred from the photoconductive drum 1 to the recording sheet P (i.e., the process 2) and is ejected to the stacker 40. Thereby, the single-sided recording sheets P are stacked face down in the proper page order.

Thus, the double-sided originals are read in increasing order of sheet numbers 1, 2, 3, and so on, and the resultant single-sided recording sheets P are output in increasing order of sheet numbers 1, 2, 3, and so on.

(5) In a method "Ba," single-sided originals are read with the first reading mechanism R1, the read images are in turn reproduced on the recording sheets P in the double-sided recording mode, and the double-sided recording sheets P are in turn ejected to the stacker 40. The single-sided originals are transferred by the automatic document feeder or ADF 250 sheet-by-sheet and are read in order of page numbers 1, 2, 3, 4, and so on. The images are formed on the photoconductive drum 1 in order of even-numbered and odd-numbered pages, such as 2, 1, 4, 3, and so on. The double-sided recording process is as follows. An image of the even-numbered page is transferred from the photoconductive drum 1 to the intermediate transfer belt 10 (i.e., the process 1). An image of the odd-numbered page is transferred from the photoconductive drum 1 to the second surface of the recording sheet P (i.e., the process 2). The image of the even-numbered page is transferred from the intermediate transfer belt 10 to the first surface of the recording sheet P (i.e., the process 3). Then, the double-sided recording sheet P is ejected to the stacker 40. The processes 1–3 are repeated. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(6) In a method "Bb," double-sided originals are read with the first reading mechanism R1, the read images are in turn reproduced on the recording sheets P in the double-sided recording mode, and the double-sided recording sheets P are in turn ejected to the stacker 40. The double-sided originals are transferred by the automatic document feeder or ADF 250 sheet-by-sheet and are read in order of even-numbered and odd-numbered pages, such as 2, 1, 4, 3, and so on. The images are formed on the photoconductive drum 1 in a patterned order of page numbers being read, such as 2, 1, 4, 3, and so on, in the double-sided recording mode (i.e., the processes 1–3). Then, the double-sided recording sheet P is ejected to the stacker 40. In the above procedure, however, the fourth page is a white page which is detected by the image sensor 78. In this case, no image is formed the fourth page and the image of the third page is generated through the process 2. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(7) In a method "Bc," single-sided originals are read with the second reading mechanism R2, the read images are in turn reproduced on the recording sheets P in the double-sided recording mode, and the double-sided recording sheets P are in turn ejected to the stacker 40. The single-sided originals are placed on the contact glass 62 sheet-by-sheet in a desired order, or in an increasing order of pages, by the user. The originals are then read with the second reading mechanism R2 in order of placement by the user, i.e., in increasing order of page numbers, such as 1, 2, 3, 4, and so on. The images are formed on the photoconductive drum 1 in a pattern of even-numbered and odd-numbered pages, such as 2, 1, 4, 3, and so on, in the double-sided recording mode (i.e., the processes 1–3). Then, the double-sided recording sheet P is ejected to the stacker 40. The processes 1–3 are repeated for each cycle of the double-sided recording mode. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(8) In a method "Bd," double-sided originals are read with the second reading mechanism P2, the read images are in turn reproduced on the recording sheets P in the double-sided recording mode, and the double-sided recording sheets P are in turn ejected to the stacker 40. The double-sided originals are placed on the contact glass 62 sheet-by-sheet in a desired order, or in an increasing order of pages from the first page, for example, by the user. The originals are then read with the second reading mechanism R2 in order of placement by the user, i.e., in increasing order of page numbers, such as 1, 2, 3, 4, and so on. The fourth page, however, is a white page and the user would normally not let it be read. Therefore, after the placement of the third page on the contact glass 62, the user can instruct a start of the recording via the control panel 50. The images are formed on the photoconductive drum 1 in a pattern of even-numbered and odd-numbered pages, such as 2 and 1 in the double-sided recording mode via the processes 1–3 and the image of the third page is generated via the process 2. Then, the double-sided recording sheets P are in turn ejected to the stacker 40. Thereby, the double-sided recording sheets P are stacked face down in the proper page order. As described above, even when the last page is a white page, the user can simply start the recording by, for example, pressing a start button on the control panel 50 so as to obtain the proper double-sided output including the last page.

Thus, the single-sided originals are read in increasing order of sheet numbers 1, 2, 3, and so on, and the resultant double-sided recording sheets P are output in increasing order of sheet numbers 1, 2, 3, and so on.

(9) In a method "Ca," single-sided originals are read with the first reading mechanism R1, the read images are in turn reproduced on the recording sheets P in the single-sided recording mode, and the single-sided recording sheets P are in turn ejected to the ejection tray 44. The single-sided originals are transferred by the automatic document feeder or ADF 250 sheet-by-sheet and are read in order of page numbers 1, 2, 3, 4, and so on. The images are formed on the photoconductive drum 1 in order of page numbers being read, such as 1, 2, 3, 4, and so on. Each formed image is recorded on the first surface of the recording sheet P via the processes 1 and 3. More specifically, the image is transferred from the photoconductive drum 1 to the intermediate transfer belt 10 (i.e., the process 1) and is further transferred from the intermediate transfer belt 10 to the recording sheet P (i.e., the process 3). Then, the double-sided recording sheet P is ejected straight to the ejection tray 44. Thereby, the single-sided recording sheets P are stacked face down in the proper page order.

Thus, the single-sided originals are read in increasing order of sheet numbers 1, 2, 3, and so on, and the resultant single-sided recording sheets P are output in increasing order of sheet numbers 1, 2, 3, and so on.

(10) In a method "Cb," double-sided originals are read with the first reading mechanism R1, the read images are in turn reproduced on the recording sheets P in the single-sided recording mode, and the resultant single-sided recording sheets P are in turn ejected to the ejection tray 44. The originals are transferred by the automatic document feeder or ADF 250 sheet-by-sheet and are read in a pattern of even-numbered and odd-numbered pages, such as 2, 1, 4, 3, and so on. The images are formed on the photoconductive drum 1 in order of page numbers 1, 2, 3, 4, and so on. However, the fourth page is detected as a white page by the image sensor 78 and therefore, no image is formed for the fourth page. Each of the formed images is transferred from the photoconductive drum 1 to the intermediate transfer belt 10 (i.e., the process 1) and then from the intermediate transfer belt 10 to the first surface of the recording sheet P (i.e., the process 3). The recording sheet P having the image on the lower surface thereof is ejected to the ejection tray 44. Thereby, the single-sided recording sheets P are stacked face down in the proper page order.

Thus, the double-sided originals are read in increasing order of sheet numbers 1, 2, 3, and so on, and the resultant single-sided recording sheets P are output in increasing order of sheet numbers 1, 2, 3, and so on.

(11) In a method "Cc," single-sided originals are read with the second reading mechanism R2, the read images are in turn reproduced on the recording sheets P in the single-sided recording mode, and the resultant single-sided recording sheets P are in turn ejected to the ejection tray 44. The single-sided originals are placed by the user on the contact glass 62 sheet-by-sheet in a desired order, or in an increasing order of page numbers, such as 1, 2, 3, 4, and so on, for example. The originals are then read with the second reading mechanism R2 in order of placement by the user, i.e., in increasing order of page numbers, such as 1, 2, 3, 4, and so on. The images are formed on the photoconductive drum 1 in increasing order of page numbers 1, 2, 3, 4, and so on. Each of the formed images is transferred eventually to the lower surface of the recording sheet P via the processes 1 and 3, and is ejected to the ejection tray 44. Thereby, the single-sided recording sheets P are stacked face down in the proper page order.

Thus, the single-sided originals are read in increasing order of sheet numbers 1, 2, 3, and so on, and the resultant single-sided recording sheets P are output in increasing order of sheet numbers 1, 2, 3, and so on.

(12) In a method "Cd," double-sided originals are read with the second reading mechanism R2, the read images are in turn reproduced on the recording sheets P in the single-sided recording mode, and the resultant single-sided recording sheets P are in turn ejected to the ejection tray 44. The double-sided originals are placed by the user on the contact glass 62 sheet-by-sheet in increasing order of page numbers, such as 1, 2, 3, 4, and so on, for example. The originals are then read with the second reading mechanism R2 in order of placement by the user, i.e., in increasing order of page numbers, such as 1, 2, 3, 4, and so on. The images are formed on the photoconductive drum 1 in increasing order of page numbers 1, 2, 3, 4, and so on. However, since the fourth page is a white page, the user does not let it be read and therefore, no image is formed for the fourth page. Each of the formed images is transferred from the photoconductive drum I eventually to the lower surface of the recording sheet P via the processes 1 and 3, and is ejected to the ejection tray 44. Thereby, the single-sided recording sheets P are stacked face down in the proper page order.

Thus, the double-sided originals are read in increasing order of sheet numbers 1, 2, 3, and so on, and the resultant single-sided recording sheets P are output in increasing order of sheet numbers 1, 2, 3, and so on.

(13) In a method "Da," single-sided originals are read with the first reading mechanism R1, the read images are in turn reproduced on the recording sheets P in the double-sided recording mode, and the double-sided recording sheets P are in turn ejected to the ejection tray 44. The single-sided originals are transferred by the automatic document feeder or ADF 250 sheet-by-sheet and are read in increasing order of page numbers 1, 2, 3, 4, and so on. The images are formed on the photoconductive drum 1 in increasing order of page numbers being read, such as 1, 2, 3, 4, and so on. In this case, the single-sided recording operation performs the processes 1–3 so that an image of the odd-numbered page is transferred to from the photoconductive drum 1 via the intermediate transfer belt 10 to the lower surface of the recording sheet P (i.e., the process 1 and 2) and an image of the even-numbered page is transferred from the photoconductive drum 1 to the upper surface of the recording sheet P (i.e., the process 3). Then, the double-sided recording sheet P is ejected to the ejection tray 44. The processes 1–3 are repeated. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(14) In a method "Db," double-sided originals are read with the first reading mechanism R1, the read images are in turn reproduced on the recording sheets P in the double-sided recording mode, and the double-sided recording sheets P are in turn ejected to the ejection tray 44. The double-sided originals are transferred by the automatic document feeder or ADF 250 sheet-by-sheet and are read in a pattern of even-numbered and odd-numbered pages, such as 2, 1, 4, 3, and so on. The images are formed on the photoconductive drum 1 in increasing order of page numbers, such as 1, 2, 3, 4, and so on, in the double-sided recording mode (i.e., the processes 1–3). Then, the double-sided recording sheet P is ejected to the ejection tray 44. In the above procedure, however, the fourth page is a white page which is detected by the image sensor 78. In this case, no image is formed the fourth page and the image of the third page is generated on the lower surface of the recording sheet P via the processes 1 and 3. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(15) In a method "Dc," single-sided originals are read with the second reading mechanism R2, the read images are in turn reproduced on the recording sheets P in the double-sided recording mode, and the double-sided recording sheets P are in turn ejected to the ejection tray 44. The single-sided originals are placed on the contact glass 62 sheet-by-sheet in a desired order, or in an increasing order of page numbers, by the user. The originals are then read with the second reading mechanism R2 in order of placement by the user, i.e., in increasing order of page numbers, such as 1, 2, 3, 4, and so on. The images are formed on the photoconductive drum 1 in increasing order of page numbers being read, such as 1, 2, 3, 4, and so on, in the double-sided recording mode (i.e., the processes 1–3). Then, the double-sided recording sheet P is ejected to the ejection tray 44. The processes 1–3 are repeated for each cycle of the double-sided recording mode. Thereby, the double-sided recording sheets P are stacked face down in the proper page order.

Thus, the single-sided originals are read in increasing order of sheet numbers 1, 2, 3, and so on, and the resultant double-sided recording sheets P are output in increasing order of sheet numbers 1, 2, 3, and so on.

(16) In a method "Dd," double-sided originals are read with the second reading mechanism R2, the read images are in turn reproduced on the recording sheets P in the double-sided recording mode, and the double-sided recording sheets P are in turn ejected to the ejection tray 44. The double-sided originals are placed on the contact glass 62 sheet-by-sheet in a desired order, or in an increasing order of page numbers from the first page, for example, by the user. The originals are then read with the second reading mechanism R2 in order of placement by the user, i.e., in increasing order of page numbers, such as 1, 2, 3, 4, and so on. The fourth page, however, is a white page and the user would normally not let it be read. Therefore, after the placement of the third page on the contact glass 62, the user can instruct a start of the recording via the control panel 50. The images are formed on the photoconductive drum 1 in increasing order of page numbers 1 and 2 in the double-sided recording mode (i.e., the processes 1–3) and the image of the third page is generated through in the single-sided recording mode (i.e., the processes 1 and 3). Then, the double-sided recording sheets P are in turn ejected to the ejection tray 44. Thereby, the double-sided recording sheets P are stacked face down in the proper page order. As described above, even when the last page is a white page, the user can simply start the recording by, for example, pressing the start button on the control panel 50 so as to obtain the proper double-sided output including the last page.

Thus, the double-sided originals are read in increasing order of sheet numbers 1, 2, 3, and so on, and the resultant double-sided recording sheets P are output in increasing order of sheet numbers 1, 2, 3, and so on.

In the above description, the operation for handling four pages of originals is exemplified. However, it is noted that the image forming apparatus of FIG. 5 can handle any number of pages of originals in accordance with the table of FIG. 9 so as to output the recorded sheets in the proper page order.

As described above, in any one of the sixteen cases, the originals are read in increasing order of sheet numbers 1, 2, 3, and so on, and the resultant recording sheets P are output in increasing order of sheet numbers 1, 2, 3, and so on.

Therefore, in both double-sided and single-sided recording modes, the user can easily check the contents of the recorded images. In addition, the user can easily restart the reproduction operation when a disturbance is caused due to a paper jam.

Further, since the image forming apparatus of FIG. 5 reads the originals from the first sheet and outputs from the first sheet, it can perform the image forming operation in an amount of time faster than the apparatus that reads the originals from the last sheet and outputs from the first sheet.

Further, since the image forming apparatus of FIG. 5 reads the originals from the first sheet and outputs from the first sheet, two pages of images need to be stored. This is far smaller than in comparison to the case where an apparatus reads the originals from the last sheet and outputs from the first sheet.

In the image forming apparatus of FIG. 5, temperature of the fixing rollers 18 and 19 can be controlled. This feature may be applied also to other embodiments of the present invention. By controlling the temperature of the fixing rollers 18 and 19, the N fixing process can be performed in an optimal condition in accordance with whatever mode of image forming is chosen, i.e., single-sided recording mode or double-sided recording mode, and whatever the type of recording sheet used, i.e., thick recording sheet or thin recording sheet. For example, the double-sided recording mode requires an amount of fixing energy greater than the single-sided recording mode. Therefore, input voltages to the fixing rollers 18 and 19 may be increased or may be applied in a more frequent manner. In addition, in the single-sided recording mode, the temperature of the fixing roller, at a side of the recording sheet having no image, may be controlled to be reduced or the input voltage to it may be turned off.

In the image forming apparatus of FIG. 5, the toner image transferred onto the intermediate transfer belt 10 needs to be prevented from melting due to the high temperature of the fixing rollers. To achieve this, an application of heat to the fixing rollers 18 and 19 is stopped or controlled during the process while the toner images are transferred from the photoconductive drum 1 to the intermediate transfer belt 10. As a result, the toner image on the intermediate transfer belt 10 is prevented from melting due to the high temperature of the fixing rollers.

In the image forming apparatus of FIG. 5, the intermediate transfer belt 10 is closely contacted by the fixing rollers 18 and 19, which may adversely affect the toner image on the intermediate transfer belt 10. To avoid this from happening, the cooling rollers 16 are arranged to cool down the intermediate transfer belt 10.

Figure 10:
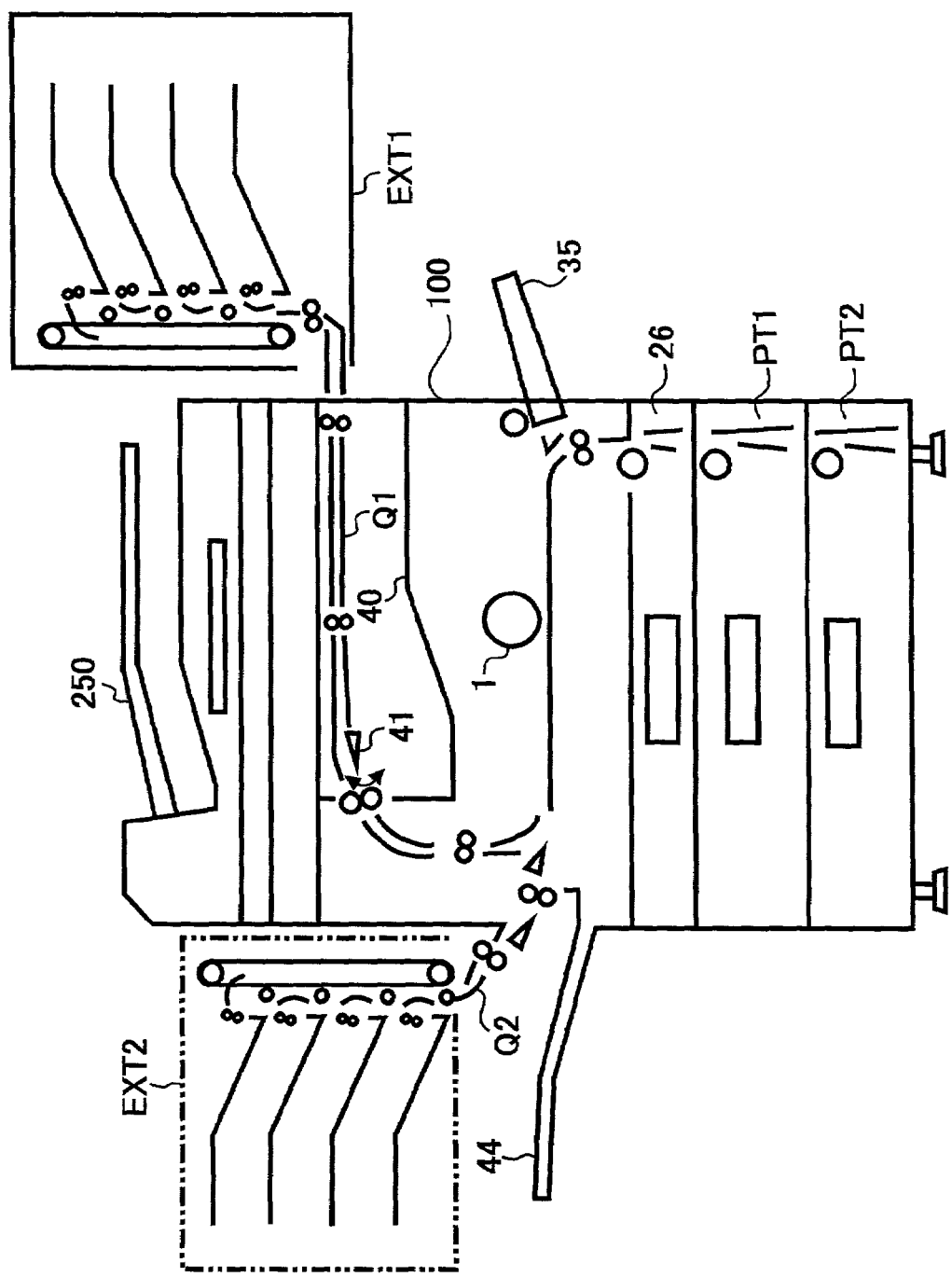
FIG. 10 is a cross-sectional view of the image forming apparatus of FIG. 5 with extra ejection trays.

FIG. 10 shows an image forming system which includes the image forming apparatus of FIG. 5 and additional apparatuses. As shown in FIG. 10, the image forming system includes sheet banks PT1 and PT2 and additional ejection apparatuses EXT1 and EXT2. The sheet banks PT1 and PT2 are arranged under the sheet cassette 26. The ejection apparatus EXT1 is arranged at a side of the automatic document feeder or ADF 250 and over the manual sheet inlet 35 and the ejection apparatus EXT2 is arranged at another side of the automatic document feeder or ADF 250 and over the ejection tray 44. Each of the ejection apparatuses EXT1 and EXT2 includes a plurality of bins which each receive the ejected recording sheets P. Each of the ejection apparatuses EXT1 and EXT2 may be a sorter for grouping recording sheets by sorting the recording sheets in increasing page number order or a collator for grouping recording sheets by collating the recording sheets with the same page number. It is also possible to install a stapling machine for stapling each stack of sheets sorted by the sorter or collated by the collator.

An additional sheet path Q1 is provided in the sheet ejection space above the stacker 40 to guide the recording sheet P sent from the ejection rollers 34 to the ejection apparatus EXT1. A switching pawl 41 is provided on an edge portion of the sheet path Q1 close to the ejection rollers 34 to switch paths for guiding the recording sheet P to either the stacker 40 or to the ejection apparatus EXT1. The sheet path Q1 is arranged at the uppermost position of the ejection space over the stacker 40 such that the stacker 40 can be used without being disturbed by the sheet path Q1.

An additional sheet path Q2 is arranged to guide the recording sheet P, ejected from the ejection rollers 32, to the ejection apparatus EXT2. A switching pawl is provided at an edge portion of the sheet path Q2 close to the ejection rollers 32 so as to switch paths for guiding the recording sheet P to either the ejection tray 44 or to the ejection apparatus EXT2.

When the recording sheet P is ejected to the ejection apparatus EXT1, it is reversed and is ejected in the same orientation as in the case of the ejection to the stacker 40. Therefore, the rules of the sheet handling, shown in the table of FIG. 9, can be applied to the case of handling the recording sheet P using the ejection apparatus EXT1.

When the recording sheet P is ejected to the ejection apparatus EXT2, it is not reversed and is ejected in the same orientation as in the case of the ejection to the ejection tray 44. Therefore, the rules of the sheet handling, shown in the table of FIG. 9, can be applied to the case of handling the recording sheet P using the ejection apparatus EXT1.

Alternatively, it is possible to configure a system having the printer 100, of FIG. 2, with the addition of the ejection apparatuses EXT1 and EXT2, although the printer 100 has no scanning machine.

Next, another image forming apparatus, according to an embodiment of the present invention, is explained with reference to FIG. 11. The image forming apparatus, of FIG. 11, includes a printer 100C., a scanner 200B, and an automatic document feeder or ADF 250B. The printer 100C is similar to the printer 100 of FIG. 2, except for having a fixing unit 30B, which is arranged outside of the intermediate transfer belt 10. The scanner 200B is similar to the scanner 200 of FIG. 5, except for a contact glass 62b which is substituted for the contact glasses 62 and 63. The automatic document feeder or ADF 250B is configured to circulate originals.

Figure 11:
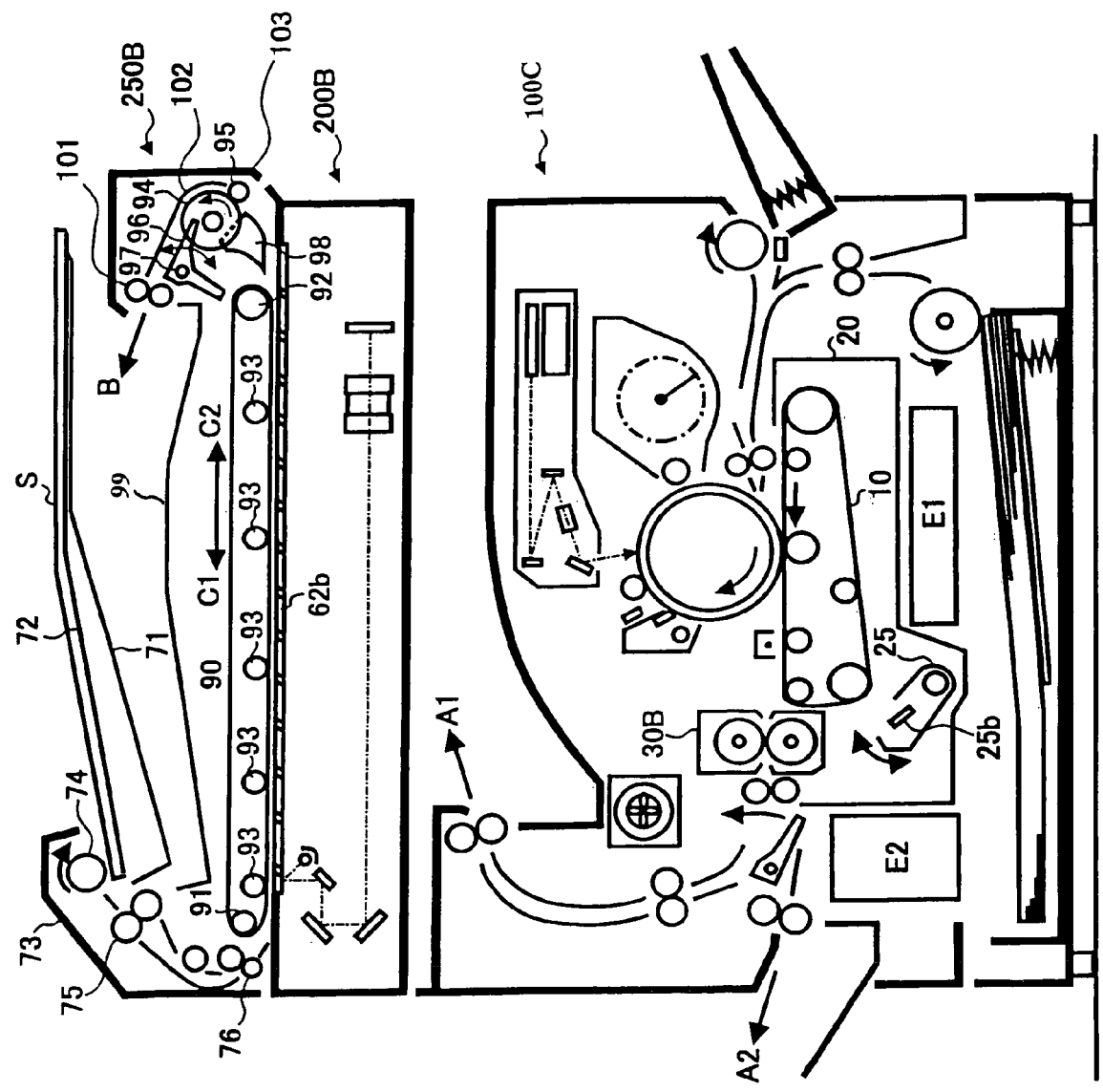
FIG. 11 is a cross-sectional view of an image forming apparatus including a modified printer, a modified scanner, and a modified automatic document feeder or ADF according to another embodiment of the present invention.

In the image forming apparatus of FIG. 11, the recording sheet P, having the transferred toner image thereon, is transferred to the fixing unit 30B and is subjected to the fixing process, after being separated from the intermediate transfer belt 10. Since the fixing unit 30B is not arranged inside of, but rather outside of the intermediate transfer belt 10, it is necessary that the fixing unit 30B be close to the intermediate transfer belt 10 so as to prevent the recording sheet P from becoming bent so that the unfixed toner image is not disturbed. This is possible since the intermediate transfer belt 10 has a property of heat resistance. This arrangement eliminates necessity of a conveyor having star-like wheels between the intermediate transfer belt 10 and the fixing unit 30B.

In addition, the cleaning unit 25 of the printer 100C is configured to clean the intermediate transfer belt 10 directly with the cleaning blade 25b.

The automatic document feeder or ADF 250B is provided with the sheet bed 71, the moving plate 72, and the sheet transfer mechanism 73, which includes all of the transfer roller 74, the separation rollers 75, and transfer rollers 76, as in the case of the automatic document feeder or ADF 250 of FIG. 5.

The automatic document feeder or ADF 250B includes a transfer belt 90, a driving roller 91, a following roller 92, and a plurality of pressing rollers 93. The transfer belt 90 is arranged at a lower part of the automatic document feeder or ADF 250B and extends, under pressure, between the driving roller 91 and the following roller 92 so as to be rotated therebetween. The positions of the driving roller 91 and the following roller 92 can be exchanged with each other. The pressing rollers 93 are arranged inside the transfer belt 90 such that the transfer belt 90 applies a slight pressure to the contact glass 62b, when the automatic document feeder or ADF 250B is in a closed state, to read originals.

The A\automatic document feeder or ADF 250B further includes a turn roller 94, a following roller 95, a switching pawl 96, a supporting shaft 97, a guide member 98, an ejection tray 99, a pair of ejection rollers 101, a guide member 102, and a cover 103. The turn roller 94 is arranged to the right side of the transfer belt 90 and in contact with the following roller 95 under pressure. The switching pawl 96 is arranged between the turn roller 94 and the ejection rollers 101 and is pivoted about the supporting shaft 97 by an actuator (not shown), such as a solenoid, for example. The guide member 98 is arranged between the turn roller 94 and the transfer belt 90.

In the automatic document feeder or ADF 250B having the above-described structure, an original is transferred to the contact glass 62b and is stopped thereon. Then, the original is read by the scanner 200B in a manner similar to the scanner 200 as described earlier with reference to FIG. 5. When the original is double-sided, the original is turned after one side is read so that the other side can be read.

An original can be placed on the contact glass 62c manually by the user by opening the automatic document feeder or ADF 250B.

A stack of the sheet-formed originals S are placed on the moving plate 72 with the first page positioned uppermost and the leading edge thereof pressed against the transfer roller 74 with a pressure member (not shown). The transfer roller 74 is rotated clockwise, as shown in FIG. 11, and consequently, the first sheet on the top of the stack is fed to a nip portion of the separation rollers 75. Thereby, the stack of the sheet-formed originals S are transferred sheet-by-sheet. The sheet-formed original S is further transferred to a nip portion between the transfer belt 90 and the contact glass 62b via the transfer rollers 76. A cover of the sheet transfer mechanism 73 is configured to open so that the user is allowed to access an inside sheet path to remove a paper jam.

The transfer belt 90 can be movable in directions indicated by arrows C1 and C2. When the transfer belt 90 is moved in the direction C1, the sheet-formed original S is transferred in the forward direction. The transfer belt 90 is stopped in a predetermined time so as to locate the sheet-formed original S at a predetermined reading position on the contact glass 62b. Then, the first page of the sheet-formed original S is scanned with the light source 64 (as discussed above with respect to FIG. 5) and the moving members 65 and 66 (as discussed above with respect to FIG. 5). After that, the transfer belt 90 is moved in the direction C2 to further transfer the sheet-formed original S to the turn roller 94.

The sheet-formed original S is transferred into the nip between the turn roller 94 and the following roller 95 and is turned along the guide member 102 and the switching pawl 96, which was switched to an upper position indicated by the upwardly-directed arrow of the double-sided pivot arrow associated with switching pawl 96 as shown in FIG. 11. Then, the sheet-formed original S is guided under the transfer belt 90 by the guide member 98. At this time, the transfer belt 90 is moved in the direction C2 for a predetermined time period so as to transfer the sheet-formed original S to the predetermined reading position. Then, the second page of the sheet-formed original S is read in the same manner as the first page is read. After a completion of reading the second page, the transfer belt 90 is moved in the direction C I to transfer the original in the forward direction. The switching pawl 96 is switched to a lower position, indicated by the downwardly-directed arrow of the double-sided pivot arrow associated with switching pawl 96 as shown in FIG. 11, so that the sheet-formed original S is guided in the direction of arrow B to ejection rollers 101. Thereby, the sheet-formed original S is ejected to an ejection tray 99 and is stacked face down in the ejection tray 99. That is, the first page faces down and the stack of the sheet-formed originals S are held in increasing order of page numbers in the ejection tray 99.

The guide member 102 is formed to have a plurality of ribs such that the sheet-formed original S is transferred with a relatively small area contacting the guide member 102. The guide member 102 is a part of the cover and is configured to be opened so that the user can easily access an internal sheet path to remove paper jam.

It is preferable that the user accesses the image forming apparatus of FIG. 11 at a position in front of it and in a direction perpendicular to FIG. 11 by placing a stack of sheet-formed originals S on the sheet bed 71, removing a stack of read sheet-formed originals S from the ejection tray 99, removing the recorded sheets P from the stacker 40, etc.

The image forming apparatus of FIG. 11, having the above-described structure, works according to the rules of sheet handling shown in the table of FIG. 9. That is, the sheet-formed originals S are read in increasing order of sheet numbers 1, 2, 3, and so on, and the resultant recording sheets P are output in increasing order of sheet numbers 1, 2, 3, and so on.

Therefore, in both double-sided and single-sided recording modes, the user can easily check the contents of the recorded images. In addition, the user can easily restart the reproduction operation when a disturbance is caused due to a paper jam.

Further, since the image forming apparatus of FIG. 11 reads the originals from the first sheet and outputs from the first sheet, it can perform the image forming operation in a time faster than the apparatus that reads the originals from the last sheet and outputs from the first sheet.

Further, since the image forming apparatus of FIG. 11 reads the originals from the first sheet and outputs from the first sheet, two pages of images must be stored. This is a far smaller amount that needs to be stored in comparison to the case of an apparatus that reads the originals from the last sheet and outputs from the first sheet.

Next, a color image forming apparatus, according to an embodiment of the present invention, is explained with reference to FIG. 12. The image forming apparatus, of FIG. 12, includes the color printer 100B, of FIG. 4, and both the scanner 200 and the automatic document feeder or ADF 250, of FIG. 5. The color image forming apparatus, of FIG. 12, is provided with a multi-function controller (not shown) for performing multi-functions as a copying machine, a facsimile machine, and a printer.

Figure 12:
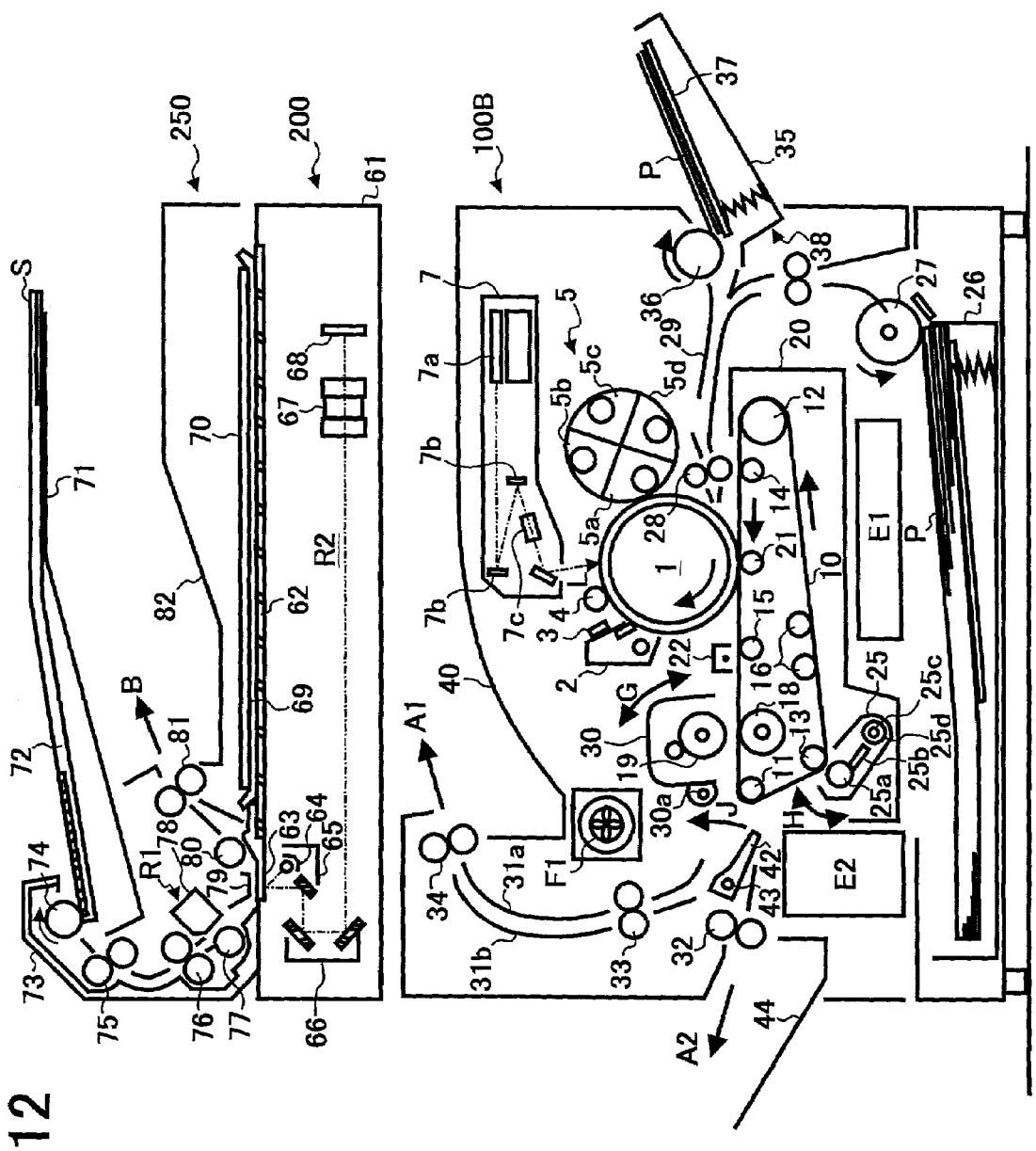
FIG. 12 is a cross-sectional view of a color image forming apparatus including the color printer of FIG. 4, the scanner of FIG. 5, and the Automatic document feeder or ADF of FIG. 5.

The color image forming apparatus, of FIG. 12, basically performs the operations in the same manner as the image forming apparatus of FIG. 5 does, except for the following. That is, in the color image forming apparatus of FIG. 12, the intermediate transfer belt 10 is separated away from the photoconductive drum 1 and is stopped on standby after the toner image for the first page is transferred to the intermediate transfer belt 10 when a double-sided original is read. During standby, the toner image for the second page is formed on the photoconductive drum 1. On the other hand, in the image forming apparatus of FIG. 5, neither the photoconductive drum 1 nor the intermediate transfer belt 10 is stopped during the image forming process. This is the difference between the color image forming apparatus of FIG. 12 and the image forming apparatus of FIG. 5.

The first and second reading mechanisms R1 and R2 is configured as color scanners for reading color image information of an original in each separate color of red (R), green (G), and blue (B) and converting the read information into electrical signals. A color image sensor of each reading mechanism R1 and R2 includes R, G, and B separators and photoelectric devices to simultaneously read three color images separated in R, G, and B and to generate R, G, and B image signals in parallel. Then, an image processing unit (not shown) performs a color conversion to generate color image data of black (Bk), cyan (C), magenta (M), and yellow (Y) colors in accordance with intensity of the R, G, and B image signals.

The first and second reading mechanisms R1 and R2 perform color scanning operations in the following manner. The first and second reading mechanisms R1 and R2 start scanning on the original upon receiving a scan start signal sent in synchronism with the operations of the color printer 100B, and then output image data in each of the four colors black (Bk), cyan (C), magenta (M), and yellow (Y). The color printer 100B in turn performs the image forming processes for the four color toner images and overlays them on top of each other so as to generate a full color toner image. The color image forming apparatus of FIG. 12 is configured to read the image data in each of the four colors during one scanning process so as to be able to capture color image data from the first and second surfaces of a double-sided original during a time of transferring that original.

The color image forming apparatus of FIG. 12, structured as described above, works according to the rules of sheet handling shown in the table of FIG. 9. That is, the originals are read in increasing order of sheet numbers 1, 2, 3, and so on, and the resultant recording sheets P are output in increasing order of sheet numbers 1, 2, 3, and so on.

Therefore, in both double-sided and single-sided recording modes, the user can easily check the contents of the recorded images. In addition, the user can easily restart the reproduction operation when a disturbance is caused due to a paper jam.

Further, since the color image forming apparatus of FIG. 12 reads the originals from the first sheet and outputs from the first sheet, it can perform the image forming operation in a time faster than the apparatus that reads the originals from the last sheet and outputs from the first sheet.

Further, since the color image forming apparatus of FIG. 12 reads the originals from the first sheet and outputs from the first sheet, two pages of images need to be stored. This is a far smaller amount that needs to be stored than in comparison to the case of an apparatus that reads the originals from the last sheet and outputs from the first sheet.

In the above-described printer 100 of FIG. 2 and the color printer 100B of FIG. 5, the intermediate transfer belt 10 may be reversely-turned to a predetermined position after the first toner image is transferred onto the intermediate transfer belt 10, instead of being moved for one turn in the forward direction. In this case, the photoconductive drum I and the intermediate transfer belt 10 are configured to be able to contact each other and separate from each other.

In addition, the printer 100 and the color printer 100B may employ a belt-shaped photoconductive member in place of the photoconductive drum 1.

Numerous additional modifications and variations of the present invention are possible in light of the above teachings. It is therefore to be understood that within the scope of the appended claims, the present application may be practiced otherwise than as specifically described herein.

What is claimed is:

1. An image forming apparatus, comprising:
a first image carrying member configured to carry at least one image transferred from at least one original in increasing order of corresponding sheet numbers;
a second image carrying member configured to carry said at least one image transferred from said first image carrying member to at least one recording sheet;
a plurality of ejection trays including a first ejection tray configured to stack said recording at least one recording sheet, which is output in a straight or forward orientation, and a second ejection tray configured to stack said at least one recording sheet, which is output in a reversed orientation; and
a sheet transferring mechanism configured to transfer said at least one recording sheet to a nip formed between said first and second image carrying members, wherein said first image carrying member is configured to transfer a first image of said at least one image to a first surface of said at least one recording sheet and, said second image carrying member is configured to transfer a second image of said at least one image to a second surface of said at least one recording sheet in response to a selection of either said first ejection tray or said second ejection tray in a double-sided recording mode so that either said first ejection tray or said second ejection tray stacks said at least one recording sheet in increasing order of page numbers, and the recording sheet follows a same transporting path to the selected ejection tray as the recording sheet follows in a single-sided recording mode.

2. The image forming apparatus as defined in claim 1, further comprising a mode selecting mechanism configured to select either a single-sided recording mode or said double-sided recording mode.

3. The image forming apparatus as defined in claim 1, further comprising a tray selecting mechanism configured to select either said first ejection tray or said second ejection tray.

4. The image forming apparatus as defined in claim 1, further comprising a sheet selecting mechanism configured to select a sheet type for said at least one recording sheet, and wherein either said first ejection tray or said second ejection tray is selected in accordance with a selection made via said sheet selecting mechanism.

5. The image forming apparatus as defined in claim 1, further comprising a plurality of sheet supplying mechanisms, wherein each sheet supplying mechanism of said plurality of sheet supplying mechanisms is configured to supply said at least one recording sheet to said sheet transferring mechanism.

6. The image forming apparatus as defined in claim 5, further comprising a cassette selecting mechanism configured to select any one of said plurality of sheet supplying mechanisms.

7. The image forming apparatus as defined in claim 5, further comprising a sheet selecting mechanism configured to select a sheet type for said at least one recording sheet, wherein any one of said plurality of sheet supplying mechanisms is selected in accordance with a selection made via said sheet selecting mechanism.

8. The image forming apparatus as defined in claim 1, further comprising an extra sheet supplying mechanism configured to insert a first recording sheet of said at least one recording sheet in an approximately straight or forward orientation, and wherein said first recording sheet is transferred from said extra sheet supplying mechanism to said first ejection tray via said sheet transferring mechanism.

9. The image forming apparatus as defined in claim 8, further comprising a sheet selecting mechanism configured to select a sheet type for said at least one recording sheet, and wherein said extra sheet supplying mechanism and said first ejection tray are selected when said sheet selecting mechanism selects said sheet type for said at least one recording sheet to be a relatively thick sheet.

10. The image forming apparatus as defined in claim 8, wherein said extra sheet supplying mechanism includes a manual sheet insertion tray.

11. The image forming apparatus as defined in claim 10, further comprising a sensor for detecting an event wherein said manual sheet insertion tray is accessed by a user, and wherein said extra sheet supplying mechanism and said first ejection tray are selected when said sensor detects said event.

12. The image forming apparatus as defined in claim 1, wherein said first image carrying member transfers said first image of said at least one image from an odd-numbered page of said at least one original to an upper surface of a first recording sheet of said at least one recording sheet and, simultaneously, said second image carrying member transfers said second image of said at least one image from of even-numbered page of said at least one original to a lower surface of said at least one recording sheet when said second ejection tray is selected in said double-sided recording mode so that said second ejection tray stacks said at least one recording sheet in said increasing order of page numbers.

13. The image forming apparatus as defined in claim 3, wherein said first image carrying member transfers said first image of said at least one image to said first surface of said at least one recording sheet and said second image carrying member transfers said second image of said at least one image to said second surface of said at least one recording sheet in response to a selection made by said tray selecting mechanism of either said first ejection tray or said second ejection tray.

14. The image forming apparatus as defined in claim 2, further comprising a control panel on which said mode selecting mechanism is mounted.

15. The image forming apparatus as defined in claim 3, further comprising a control panel on which said tray selecting mechanism is mounted.

16. The image forming apparatus as defined in claim 4, further comprising a control panel on which said sheet selecting mechanism is mounted.

17. The image forming apparatus as defined in claim 6, further comprising a control panel on which said cassette selecting mechanism is mounted.

18. The image forming apparatus as defined in claim 1, further comprising external host system wherein selections are made between a single-sided recording mode and said double-sided recording mode, said first and second ejection trays, and a sheet type of said at least one recording sheet.

19. The image forming apparatus as defined in claim 5, further comprising an external host system which selects between said plurality of sheet supplying mechanisms.

20. The image forming apparatus as defined in claim 1, wherein said first image carrying member is a photoconductive drum which carries said at least one image in the form of a toner image in accordance with an electrophotographic method and said second image carrying member carries said at least one image in the form of said toner image transferred from said first image carrying member.

21. An image forming apparatus, comprising:
  an image reading mechanism configured to read at least one image from at least one original;
  an image recording mechanism configured to perform image recording operations including image forming, image carrying, and image transferring processes so that said at least one image read from said at least one original is recorded onto at least one recording sheet;
  a plurality of ejection trays into which said at least one recording sheet is ejected;
  a plurality of sheet cassettes in which said at least one recording sheet is stacked prior to being used in said image recording operations; and
  a sheet transferring mechanism configured to transfer said at least one recording sheet from one of said plurality of sheet cassettes to a nip formed between first and second image carrying members, wherein said image recording mechanism performs said image recording operations in response to a selection of one of said plurality of ejection trays in accordance with said at least one image read from said at least one original read via said image reading mechanism in either a single-sided recording mode or a double-sided recording mode so that said at least one recording sheet is stacked in an increasing order of page numbers in said one of said plurality of ejection trays which was selected and, wherein a path of travel for said at least one recording sheet provided from said one sheet cassette to said one ejection tray is the same in both the single-sided recording mode and the double-sided recording mode.

22. The image forming apparatus as defined in claim 21, wherein said image recording mechanism forms said at least one image in the form of a toner image in accordance with an electrophotographic method, said image recording mechanism comprising:
  said first image carrying member configured to form said toner image and to carry said toner image thereon in said increasing order of page numbers starting from a first page; and
  said second image carrying member configured to carry said toner image transferred from said first image carrying member, said first image carrying member transferring said toner image to a first side of said at least one recording sheet and said second image carrying member transferring said toner image to a second side of said at least one recording sheet.

23. The image forming apparatus as defined in claim 21, wherein said plurality of ejection trays includes a first ejection tray configured to stack said at least one recording sheet output in a straight or forward orientation and a second ejection tray configured to stack said at least one recording sheet output in a reversed orientation.

24. The image forming apparatus as defined in claim 21, wherein said at least one recording sheet stacked in said increasing order of page numbers is recorded in said single-sided recording mode.

25. The image forming apparatus as defined in claim 21, wherein said at least one recording sheet stacked in said increasing order of page numbers is recorded in said double-sided recording mode.

26. The image forming apparatus as defined in claim 21, wherein either said image reading mechanism reads a first image of said at least one image from a first side of a single-sided original of said at least one original in a single-sided reading mode or said image reading mechanism reads first and second images of said at least one image from first and second sides, respectively, of a double-sided original of said at least one original in a double-sided reading mode.

27. The image forming apparatus as defined in claim 26, wherein when said first and second images of said at least one image are read in said double-sided reading mode by said image reading mechanism, said image recording mechanism records said first and second images in said single-sided recording mode and outputs said at least one recording sheet in said increasing order of page numbers.

28. The image forming apparatus as defined in claim 26, wherein when said first and second images of said at least one image are read in said double-sided reading mode by said image reading mechanism, said image recording mechanism records said first and second images in said double-sided recording mode and outputs said at least one recording sheet in said increasing order of page numbers.

29. The image forming apparatus as defined in claim 26, wherein said image reading mechanism reads said first and second images of said at least one image on both said first and second sides, respectively, of said double-sided original via a one time sheet transferring process in which said double-sided original is moved.

30. The image forming apparatus as defined in claim 29, wherein said image reading mechanism comprises:
  a first image reading unit configured to read said at least one image of said at least one original by moving said at least one original; and a second image reading unit configured to read said at least one image of said at least one original by holding said at least one original at a predetermined position.

31. The image forming apparatus as defined in claim 30, wherein said second image reading unit includes a moving member configured to move under a contact glass, said moving member being used as a part of said first image reading unit under a condition that said moving member is stopped.

32. The image forming apparatus as defined in claim 30, wherein said second image reading unit is usable when said at least one original is placed on a sheet tray of said first image reading unit.

33. The image forming apparatus as defined in claim 26, wherein said image reading mechanism includes a sheet reversing mechanism so that said image reading mechanism reads said first and second images of said at least one image on both said first and second sides, respectively, of said at least one original.

34. The image forming apparatus as defined in claim 21, wherein said image reading mechanism includes a detector for detecting when said at least one image is attempted to be read from a blank white sheet in order to cancel reading of said art least one image.

35. The image forming apparatus as defined in claim 21, wherein one of said plurality of ejection trays is formed in a space between said image reading mechanism and said image recording mechanism.

36. The image forming apparatus as defined in claim 21, wherein said image reading mechanism includes an ejected original tray configured to hold ejected ones of said at least one original, said ejected original tray of said image reading mechanism having a size slightly smaller than a projection area of said image forming apparatus.

37. The image forming apparatus as defined in claim 21, wherein said at least one recording sheet is transferred in an approximately straight line when being transferred from a first sheet cassette of said plurality of sheet cassettes to a first ejection tray of said plurality of ejection trays.

38. The image forming apparatus as defined in claim 37, wherein said first sheet cassette of said plurality of sheet cassettes is a manual sheet inserting tray.

39. The image forming apparatus as defined in claim 21, further comprising a control panel located close to said image reading mechanism, said control panel comprising:
a singled-sided/double-sided recording mode selecting mechanism configured to select one of said single-sided recording mode and said double-sided recording mode; and
an ejection tray selecting mechanism configured to select one of said plurality of ejection trays.

40. The image forming apparatus as defined in claim 21, wherein said image recording mechanism records said at least one image in an increasing order of corresponding sheet numbers.

41. The image forming apparatus as defined in claim 21, wherein said image recording mechanism forms said at least one image in said increasing order of page numbers when said image reading mechanism reads said at least one image in said increasing order of page numbers.

42. The image forming apparatus as defined in claim 21, wherein said image recording mechanism includes a first image carrying member which is a photoconductive drum and a second image carrying member which is a belt-shaped intermediate transfer member having a surface resistance in a range of from $10^5$ $\Omega$ to $10^{12}$ $\Omega$.

43. The image forming apparatus as defined in claim 42, further comprising a fixing mechanism configured to fix said at least one image which has been attached on both sides of said at least one recording sheet while said at least one recording sheet is being supported by said belt-shaped intermediate transfer member.

44. The image forming apparatus as defined in claim 42, wherein said belt-shaped intermediate transfer member is heat resistant.

45. The image forming apparatus as defined in claim 21, wherein said image recording mechanism performs said image recording operation in accordance with image information sent from an external host system, said external host system selecting one of said single-sided recording mode and said double-sided recording mode and one of said plurality of ejection trays.

46. The image forming apparatus as defined in claim 21, further comprising a first external ejection tray unit that includes a first connecting sheet path connected to a sheet path of said image forming apparatus for turning and ejecting said at least one recording sheet sent from said image recording mechanism into one of said plurality of ejection trays, wherein said first external ejection tray unit is configured to stack said at least one recording sheet in said increasing order of page numbers.

47. The image forming apparatus as defined in claim 46, wherein said first connecting sheet path is arranged along an edge portion of said one of said plurality of ejection trays.

48. The image forming apparatus as defined in claim 47, further comprising a switching pawl configured to selectively switch between pathways for said at least one recording sheet to said one of said plurality of ejection trays and said external ejection tray unit.

49. The image forming apparatus as defined in claim 46, further comprising a second external ejection tray unit including a second connecting sheet path connected to a sheet path of said image forming apparatus for ejecting said at least one recording sheet sent from said image recording mechanism in an approximately straight line manner into said one of said plurality of ejection trays, wherein said second external ejection tray unit is configured to stack said at least one recording sheet in said increasing order of page numbers.

50. An image forming apparatus, comprising:
first image carrying means for carrying at least one image in increasing order of corresponding sheet numbers;
second image carrying means for carrying said at least one image transferred from said first image carrying means;
a plurality of ejection tray means including first ejection tray means for stacking at least one recording sheet onto which said at least one image has been transferred in a straight or forward orientation and second ejection tray means for stacking said at least one recording sheet in a reversed orientation; and
sheet transferring means for transferring said at least one recording sheet to a nip formed between said first and second image carrying means, wherein said first image carrying means transfers a first image of said at least one image to a first surface of said at least one recording sheet and, said second image carrying means transfers a second image of said at least one image to a second surface of said at least one recording sheet in response to a selection of either of said first and second ejection tray means in a double-sided recording mode so that said first and second ejection tray means stack said at least one recording sheet in increasing order of page numbers and the recording sheet follows the same transporting path to the selected ejection tray means as the recording sheet follows in a single-sided recording mode.

51. The image forming apparatus as defined in claim 50, further comprising mode selecting means for selecting one of a single-sided recording mode and said double-sided recording mode.

52. The image forming apparatus as defined in claim 50, further comprising tray selecting means for selecting one of said first and second ejection tray means.

53. The image forming apparatus as defined in claim 50, further comprising sheet selecting means for selecting a sheet type for said at least one recording sheet, and wherein one of said first and second ejection tray means is selected in accordance with a selection made by said sheet selecting means.

54. The image forming apparatus as defined in claim 50, further comprising a plurality of sheet supplying means each for supplying said at least one recording sheet to said sheet transferring means.

55. The image forming apparatus as defined in claim 54, further comprising cassette selecting means for selecting one of said plurality of sheet supplying means.

56. The image forming apparatus as defined in claim 54, further comprising sheet selecting means for selecting a sheet type for said at least one recording sheet, and wherein one of said plurality of sheet supplying means is selected in accordance with a selection made by said sheet selecting means.

57. The image forming apparatus as defined in claim 50, further comprising extra sheet supplying means for inserting said at least one recording sheet in an approximately straight or forward orientation, and wherein said at least one recording sheet is transferred from said extra sheet supplying means to said first ejection tray means via said sheet transferring means.

58. The image forming apparatus as defined in claim 57, further comprising sheet selecting means for selecting a sheet type for said at least one recording sheet, and wherein said extra sheet supplying means and said first ejection tray means are selected when said sheet selecting means selects said at least one recording sheet to be of said sheet type so as to be a relatively thick sheet.

59. The image forming apparatus as defined in claim 57, wherein said extra sheet supplying means includes manual sheet insertion tray means.

60. The image forming apparatus as defined in claim 59, further comprising sensing means for detecting an event wherein said manual sheet insertion tray means is accessed by a user, and wherein said extra sheet supplying means and said first ejection tray means are selected when said sensing means detects said event.

61. The image forming apparatus as defined in claim 50, wherein said first image carrying means transfers said at least one image from an odd-numbered page of said at least one original to an upper surface of said at least one recording sheet and, simultaneously, said second image carrying means transfers said at least one image from an even-numbered page of said at least one original on a lower surface of said at least one recording sheet when said second ejection tray means is selected in said double-side recording mode so that said second ejection tray means stacks said at least one recording sheet in said increasing order of page numbers.

62. The image forming apparatus as defined in claim 52, wherein said first image carrying means transfers said first image of said at least one image to said first surfaces of said at least one recording sheet and said second image carrying means transfers said second image of said at least one image on said second surfaces of said at least one recording sheet in response to a selection made by said tray selecting means between said first and second ejection tray means.

63. The image forming apparatus as defined in claim 51, further comprising a control panel on which said mode selecting means is mounted.

64. The image forming apparatus as defined in claim 52, further comprising a control panel on which said tray selecting means is mounted.

65. The image forming apparatus as defined in claim 53, further comprising a control panel on which said sheet selecting means is mounted.

66. The image forming apparatus as defined in claim 55, further comprising a control panel on which said cassette selecting means is mounted.

67. The image forming apparatus as defined in claim 50, further comprising an external host system which selects between a single-sided recording mode and said double-sided recording mode, said first and second ejection tray means, and a sheet type for said at least one recording sheet.

68. The image forming apparatus as defined in claim 54, further comprising an external host system which makes a selection from among said plurality of sheet supplying means.

69. The image forming apparatus as defined in claim 50, wherein said image recording mechanism includes a first image carrying means, which is a photoconductive drum, for carrying said at least one image in the form of a toner image made in accordance with an electrophotographic method and said second image carrying means for carrying said toner image transferred from said first image carrying means.

70. An image forming apparatus, comprising:
image reading means for reading at least one image from at least one original;
image recording means for performing image recording operations including image forming, image carrying, and image transferring processes so that said at least one image read from said at least one original are recorded onto at least one recording sheet;
a plurality of ejection tray means into which said at least one recording sheet is ejected;
a plurality of sheet cassette means in which said at least one recording sheet is stacked prior to being used in said image recording operations; and
sheet transferring means for transferring said at least one recording sheet from one of said plurality of sheet cassette means to a nip formed between first and second image carrying means, wherein said image recording means performs said image recording operations in response to a selection between said plurality of ejection tray means in accordance with said at least one image from said at least one original read by said image reading means either in a single-sided recording mode or a double-sided recording mode so that said at least one recording sheet is stacked in said plurality of ejection tray means in increasing order of page numbers and, in the double-sided recording mode, the recording sheet follows the same transporting path to the selected ejection tray means as the recording sheet follows in a single-sided recording mode.

71. The image forming apparatus as defined in claim 70, wherein said image recording means records said at least one image in the form of a toner image in accordance with an electrophotographic method, said image recording means comprising:

said first image carrying means for forming said toner image and carrying said toner image thereon in said increasing order of page numbers starting from a first page; and second image carrying means for carrying said toner image transferred from said first image carrying means, said first image carrying means transferring said toner image to a first side of a first recording sheet of said at least one recording sheet and said second image carrying means transferring said toner image to a second side of a second recording sheet of said at least one recording sheet.

72. The image forming apparatus as defined in claim 70, wherein said plurality of ejection tray means includes first ejection tray means for stacking said at least one recording sheet output in a straight or forward orientation and a second ejection tray means for stacking said at least one recording sheet output in a reversed orientation.

73. The image forming apparatus as defined in claim 70, wherein said at least one recording sheet, stacked in said increasing order of page numbers, is recorded in said single-sided recording mode.

74. The image forming apparatus as defined in claim 70, wherein said at least one recording sheet, stacked in said increasing order of page numbers, is recorded in said double-sided recording mode.

75. The image forming apparatus as defined in claim 70, wherein said image reading means reads said at least one image on a side of a single-sided original in a single-side reading mode and said at least one image on both sides of a double-sided original in a double-side reading mode.

76. The image forming apparatus as defined in claim 75, wherein said image recording means records said at least one image in said single-sided recording mode in said increasing order of page numbers when said at least one image is read in said double sided reading mode by said image reading means.

77. The image forming apparatus as defined in claim 75, wherein said image recording means records said at least one image in said double-sided recording mode and outputs said at least one image in said increasing order of page numbers when said at least one image is read in said double-sided reading mode by said image reading means.

78. The image forming apparatus as defined in claim 75, wherein said image reading means reads said at least one image on both sides of said double-sided original via a one time sheet transferring process by moving said double-sided original.

79. The image forming apparatus as defined in claim 78, wherein said image reading means comprises:

first image reading means for reading said as least one image of said at least one original by moving said at least one original; and second image reading means for reading said as least one image of said as least one original by holding said as least one original at a predetermined position.

80. The image forming apparatus as defined in claim 79, wherein said second image reading means includes moving means for moving under a contact glass, said second image reading means being used as a part of said first image reading means under a condition in that said moving means is stopped.

81. The image forming apparatus as defined in claim 79, wherein said second image reading means is usable when said at least one original is placed on a sheet tray of said first image reading means.

82. The image forming apparatus as defined in claim 75, wherein said image reading means includes sheet reversing means for reversing said at least one original, said image reading means reading said at least one image on both sides of said at least one original.

83. The image forming apparatus as defined in claim 70, wherein said image reading means includes detecting means for detecting a blank white sheet and canceling reading of said at least one image.

84. The image forming apparatus as defined in claim 70, wherein one of said plurality of ejection tray means is formed in a space between said image reading means and said image recording means.

85. The image forming apparatus as defined in claim 70, wherein said image reading means includes an ejected original tray means for ejecting said at least one original, said ejected original tray means having a size slightly smaller than a projection area of said image forming apparatus.

86. The image forming apparatus as defined in claim 70, wherein said at least one recording sheet is transferred in an approximately straight line from one of said plurality of sheet cassette means to one of said plurality of ejection tray means.

87. The image forming apparatus as defined in claim 86, wherein said one of said plurality of sheet cassette means is a manual sheet inserting tray means.

88. The image forming apparatus as defined in claim 70, further comprising control panel means located close to said image reading means, said control panel means comprising:

single-sided/double-sided recording mode selecting means for selecting one of said single-sided recording mode and said double-sided recording mode; and ejection tray selecting means for selecting one of said plurality of ejection tray means.

89. The image forming apparatus as defined in claim 70, wherein said image recording means forms said at least one image in said increasing order of corresponding sheet numbers.

90. The image forming apparatus as defined in claim 70, wherein said image recording means forms said at least one image in said increasing order of page numbers when said image reading means reads said at least one image in said increasing order of page numbers.

91. The image forming apparatus as defined in claim 70, wherein said first image carrying means is a photoconductive drum and said second image carrying means is belt-shaped intermediate transfer means having a surface resistance in a range of from $10^5$ $\Omega$ to $10^{12}$ $\Omega$.

92. The image forming apparatus as defined in claim 91, further comprising fixing means for fixing images attached on both sides of said at least one recording sheet while said at least one recording sheet is supported by said belt-shaped intermediate transfer means.

93. The image forming apparatus as defined in claim 91, wherein said belt-shaped intermediate transfer means is heat resistant.

94. The image forming apparatus as defined in claim 70, wherein said image recording means performs said image recording operations in accordance with image information sent from an external host system, said external host system selecting one of said single-sided recording mode and said double-sided recording mode and one of said plurality of ejection tray means.

95. The image forming apparatus as defined in claim 70, further comprising a first external ejection tray means for stacking said at least one recording sheet in said increasing order of page numbers, wherein said first external ejection tray means includes a first connecting sheet path connected to a sheet path of said image forming apparatus for turning and ejecting said at least one recording sheet sent from said image recording means into one of said plurality of ejection tray means.

96. The image forming apparatus as defined in claim 95, wherein said first connecting sheet path is arranged along an edge portion of said one of said plurality of ejection tray means.

97. The image forming apparatus as defined in claim 96, further comprising switching pawl means for selectively switching between pathways for said at least one recording sheet to said one of said plurality of ejection tray means and said external ejection tray means.

98. The image forming apparatus as defined in claim 95, further comprising a second external ejection tray means for stacking said at least one recording sheet in said increasing order of page numbers, wherein said second external ejection tray means includes a second connecting sheet path connected to a sheet path of said apparatus for ejecting said at least one recording sheet sent from said image recording means in an approximately straight manner into one of said plurality of ejection tray means.

99. A method for image forming, comprising the steps of:
  selecting one of a single-sided recording mode and a double-sided recording mode to record at least one image from at least one original onto at least one recording sheet;
  selecting one ejection tray from a plurality of ejection trays;
  choosing one of a face-down stack and a face-up stack;
  inputting a plurality of images in increasing order of page numbers;
  performing a double-sided recording operation when said double-sided recording mode is selected, said performing step comprising the steps of:
    forming two successive images of said at least one image in increasing order of corresponding sheet numbers;
    transferring said two successive images of said at least one image onto both surfaces of said at least one recording sheet;
    fixing said two successive images of said at least one image attached on said both surfaces of said at least one recording sheet;
    transporting said at least one recording sheet to said one ejection tray;
    stacking said at least one recording sheet in an orientation in accordance with whether said face-down stack or said face-up stack is chosen in said choosing step; and
    repeating said performing step until said at least one image input by said inputting step are recorded;
  executing a single-sided recording operation when said single-sided recording mode is selected, said executing step comprising the steps of:
    forming said at least one image in increasing order of corresponding sheet numbers;
    transferring said at least one image onto one surface of said at least one recording sheet;
    fixing said at least one image attached on said one surface of said at least one recording sheet;
    transporting said at least one recording sheet to said one ejection tray;
    stacking said recording sheet in an orientation in accordance with whether said face-down stack or said face-up stack was chosen in said choosing step; and
  repeating said executing step until said at least one image input by said inputting step are recorded, wherein said transporting during the double-sided recording operation transports said at least one recording sheet along the same path as is used during transporting said recording sheet during executing a single sided recording operation.

100. The method as defined in claim 99, wherein said inputting step reads said at least one original and generates data of said at least one image.

* * * * *